United States Patent
Datta et al.

(10) Patent No.: US 12,455,661 B2
(45) Date of Patent: Oct. 28, 2025

(54) PIEZOELECTRIC TRANSDUCERS FOR DETECTION OF TOUCH ON A SURFACE

(71) Applicant: Apple Inc., Cupertino, CA (US)

(72) Inventors: Supratik Datta, Saratoga, CA (US); John K. Frankovich, Alameda, CA (US); Ehsan Khajeh, Los Gatos, CA (US); Omid Mahdavipour, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/458,977

(22) Filed: Aug. 30, 2023

(65) Prior Publication Data

US 2024/0126394 A1  Apr. 18, 2024

Related U.S. Application Data

(60) Provisional application No. 63/379,705, filed on Oct. 14, 2022.

(51) Int. Cl.
*G06F 3/043* (2006.01)
*G06F 3/044* (2006.01)

(52) U.S. Cl.
CPC ............ *G06F 3/043* (2013.01); *G06F 3/0436* (2013.01); *G06F 3/044* (2013.01); *G06F 2203/04106* (2013.01)

(58) Field of Classification Search
CPC ........ G06F 3/043; G06F 3/0436; G06F 3/044; G06F 2203/04106
See application file for complete search history.

(56) References Cited

U.S. PATENT DOCUMENTS

| | | | |
|---|---|---|---|
| 2014/0023210 A1* | 1/2014 | Sheng | H04R 29/00 |
| | | | 381/114 |
| 2016/0313793 A1 | 10/2016 | Hong et al. | |
| 2018/0032211 A1* | 2/2018 | King | G06F 3/04186 |
| 2019/0354238 A1 | 11/2019 | Akhbari et al. | |
| 2020/0042130 A1* | 2/2020 | Pragada | H03K 17/9643 |
| 2020/0333914 A1 | 10/2020 | Khajeh et al. | |
| 2020/0348794 A1 | 11/2020 | Ralston et al. | |
| 2022/0390598 A1 | 12/2022 | Soldner et al. | |
| 2023/0018184 A1* | 1/2023 | Lehmann | G06F 3/016 |
| 2023/0195265 A1 | 6/2023 | Xu et al. | |

* cited by examiner

*Primary Examiner* — Cory A Almeida
(74) *Attorney, Agent, or Firm* — Kubota & Basol LLP

(57) ABSTRACT

Examples of the disclosure are directed to the use of one or more piezoelectric (PE) transducers for detecting one or more touches on a surface. In some embodiments, the one or more PE transducers can complement a capacitive touch sensor array and provide a confirmation that a touch has in fact occurred, and can provide a secondary determination of touch location. In some examples, the one or more PE transducers can be formed on, or as part of, a flex circuit that is adhered to a housing or other structure to which the touch surface is affixed. The flex circuit can be formed as a strip upon which the one or more PE transducers are attached, and can be shaped and sized (optionally with a fold to create a tail for electrical connections) to adhere to an inner or outer surface of the housing.

20 Claims, 15 Drawing Sheets

PIEZOELECTRIC TRANSDUCERS FOR DETECTION OF TOUCH ON A SURFACE

CROSS-REFERENCE TO RELATED APPLICATIONS

This application claims the benefit of U.S. Provisional Application No. 63/379,705, filed Oct. 14, 2022, the content of which is herein incorporated by reference in its entirety for all purposes.

FIELD OF THE DISCLOSURE

This relates generally to touch sensing using one or more piezoelectric (PE) transducers for detecting one or more touches on a surface.

BACKGROUND OF THE DISCLOSURE

Many types of electronic devices are presently available that are capable of receiving touch input to initiate operations. Examples of such devices include desktop, laptop and tablet computing devices, smartphones, media players, wearables such as watches and health monitoring devices, smart home control and entertainment devices, headphones and earbuds, and devices for computer-generated environments such as augmented reality, mixed reality, or virtual reality environments. Many of these devices can receive input through the physical touching of buttons or keys, mice, trackballs, joysticks, touch panels, touch screens and the like.

Capacitive touch sensors are commonly used to detect a touch on a touch surface, and provide many advantages. However, because of the localized nature of capacitive touch sensing, capacitive touch sensors are required directly under the touch sensing area. As products are developed with larger touch surfaces, the number of required capacitive touch sensors increases, which can lead to increases in ASIC size and I/O, higher cost and power, and increased integration complexity. Furthermore, because capacitive touch sensors rely upon the capacitive coupling between a relatively conductive object (e.g., a user's finger) and a single conductive electrode or an array of conductive electrodes separated by dielectric materials (e.g. glass, plastic, etc.), for touch detection, they cannot be used with conductive (e.g., metal) touch surfaces, as a metallic touch surface would shield the finger from the sensor electrodes. A similar shielding effect can be caused by smeared water even on non-conductive touch surfaces, and thus it can be unreliable to track a finger on a wet surface using capacitive sensing. In addition, false touch detections can occur when an object, especially a larger object (e.g., a palm) is hovering over, but not actually touching, the touch surface. This inability to distinguish between hovering and touching objects can be exacerbated when the capacitive touch sensors are located below relatively thick touch surface materials or if the finger is covered with a thick glove.

SUMMARY

Examples of the disclosure are directed to the use of one or more piezoelectric (PE) transducers for detecting one or more touches on a touch surface. In some embodiments, the one or more PE transducers can be arranged around the perimeter of a touch surface that includes a touch sensing array (e.g., an array of capacitive touch sensors). The PE transducers can complement the capacitive touch sensor array and provide a confirmation that a touch has in fact occurred, and can provide a secondary determination of touch location. In some examples, the one or more PE transducers can be formed on, or as part of, a flex circuit that is adhered to a housing or other structure to which the touch surface is affixed. The flex circuit can be formed as a strip upon which the one or more PE transducers are attached, and can be shaped and sized (optionally with a fold to create a tail for electrical connections) to adhere to an inner or outer surface of the housing. The one or more PE transducers can be uniformly or nonuniformly spaced apart around the entirety or a portion of the touch surface.

In some embodiments, the PE transducers can be configured for active sensing which involves actively driving at least one PE transducer with some desired waveform. In one example, time-of-flight (TOF) principles can be employed. When a TOF modality is employed, one or more PE transducers can be configured to transmit an ultrasonic wave into and across the touch surface. If no object is in contact with the touch surface, the ultrasonic wave will propagate with minimal reflections, and after impinging on distal surfaces (e.g., surfaces on the opposite side of the touch surface from the PE transducer), will reflect back to the PE transducer. However, if an object is present, due to acoustic impedance mismatches between the touch surface and the touching object, the ultrasonic wave will reflect back to the PE transducer sooner than if no object were present. The TOF of the reflected ultrasonic wave can be measured and used to determine whether an object was present, and if so, where it was located.

In another example, tomography (absorption) principles can be employed. When a tomography modality is employed, one or more PE transducers can be configured as a PE transmitter to transmit an ultrasonic wave into and across the touch surface. If no object is in contact with the touch surface, the ultrasonic wave will propagate with minimal reflections until it is received at one or more PE transducers configured as a PE receiver. However, if an object is present, some of the energy of the ultrasonic wave will be absorbed by the object, and some of the energy will pass through the object and be detected at a PE receiver. However, the energy level of the attenuated ultrasonic waves received at the PE receiver will drop. Based on the reduction in the received energy levels, the presence and the location of the object can be determined.

In yet another example, absorption principles can again be employed, but known partial reflectors or barriers can be placed at strategic locations below or within the touch surface to detect touches in particular regions of the touch surface. In this modality, a portion of the energy of ultrasonic waves generated by PE transducers can partially reflect back from these partial reflectors and be detected at the originating PE transducer. However, some of the energy can pass through the partial reflectors and reach distal surfaces on the opposite side of the touch surface, where they can reflect back and be detected at the originating PE transducer. The energy levels of those two reflections can be captured and stored as baseline no-touch reflected energy levels. Reflected energy levels consistent with the stored baseline can indicate that no touch is present. However, if an object is present, some of the energy of the ultrasonic waves will be absorbed by the object. Depending on where the object is located (before or after the partial reflector), the energy levels of both reflections will vary, and depending on the energy levels of the reflections, the presence and location of the touching object (either before or after the partial reflector) can be determined.

In some embodiments, the piezoelectric transducers can be configured for passive sensing which means that all the PE transducers will operate in "listening-only" mode and none of them will be driven with any signal. A touching object generates time-varying stress on the touch surface and can cause acoustic waves to propagate within the touch surface. In one example, various gestures can be performed at different locations on the touch surface, and the TOF between the location of touch gesture and each of the PE transducers can be used to triangulate the touch location. For this approach, the texture of the touch surface can be configured to enhance the detection of gestures on the touch surface. This method requires that the PE transducers be placed at appropriate distances to capture various phases of the acoustic wave.

In another example, the PE transducers can be configured to detect low frequency signals (e.g., infrasonic frequencies below about 20 Hz) generated by slowly time-varying stresses in the touch surface of the device due to a touch on the touch surface. In this example, various gestures can be performed at different locations on the touch surface, and a map of the peak signal received at each of a plurality of PE transducers while the gestures are being performed can be generated and used to produce a quasi-static stress "signature" of various gestures and gesture locations for training a touch detection algorithm. After this training is complete, PE transducers can be configured to analyze the stress produced by a touch gesture at different locations on the touch surface and detect touch at these locations.

DETAILED DESCRIPTION

Figure 1A:
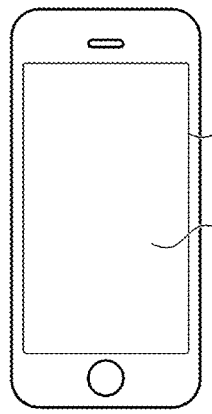
FIGS. 1A-1I illustrate systems in which one or more piezoelectric transducers located along a perimeter of a touch surface can be employed for touch detection according to examples of the disclosure.

In the following description of various examples, reference is made to the accompanying drawings which form a part hereof, and in which it is shown by way of illustration specific examples that can be practiced. It is to be understood that other examples can be used and structural changes can be made without departing from the scope of the various examples.

Examples of the disclosure are directed to the use of one or more piezoelectric (PE) transducers for detecting one or more touches on a touch surface. In some embodiments, the one or more PE transducers can be arranged around the perimeter of a touch surface that includes a touch sensing array (e.g., an array of capacitive touch sensors). The PE transducers can complement the capacitive touch sensor array and provide a confirmation that a touch has in fact occurred, and can provide a secondary determination of touch location. In some examples, the one or more PE transducers can be formed on, or as part of, a flex circuit that is adhered to a housing or other structure to which the touch surface is affixed. The flex circuit can be formed as a strip upon which the one or more PE transducers are attached, and can be shaped and sized (optionally with a fold to create a tail for electrical connections) to adhere to an inner or outer surface of the housing. The one or more PE transducers can be uniformly or nonuniformly spaced apart around the entirety or a portion of the touch surface.

In some embodiments, the PE transducers can be configured for active sensing which involves actively driving at least one PE transducer with some desired waveform. In one example, time-of-flight (TOF) principles can be employed.

When a TOF modality is employed, one or more PE transducers can be configured to transmit an ultrasonic wave into and across the touch surface. If no object is in contact with the touch surface, the ultrasonic wave will propagate with minimal reflections, and after impinging on distal surfaces (e.g., surfaces on the opposite side of the touch surface from the PE transducer), will reflect back to the PE transducer. However, if an object is present, due to acoustic impedance mismatches between the touch surface and the touching object, the ultrasonic wave will reflect back to the PE transducer sooner than if no object were present. The TOF of the reflected ultrasonic wave can be measured and used to determine whether an object was present, and if so, where it was located.

In another example, tomography (absorption) principles can be employed. When a tomography modality is employed, one or more PE transducers can be configured as a PE transmitter to transmit an ultrasonic wave into and across the touch surface. If no object is in contact with the touch surface, the ultrasonic wave will propagate with minimal reflections until it is received at one or more PE transducers configured as a PE receiver. However, if an object is present, some of the energy of the ultrasonic wave will be absorbed by the object, and some of the energy will pass through the object and be detected at a PE receiver. However, the energy level of the attenuated ultrasonic waves received at the PE receiver will drop. Based on the reduction in the received energy levels, the presence and the location of the object can be determined.

In yet another example, absorption principles can again be employed, but known partial reflectors or barriers can be placed at strategic locations below or within the touch surface to detect touches in particular regions of the touch surface. In this modality, a portion of the energy of ultrasonic waves generated by PE transducers can partially reflect back from these partial reflectors and be detected at the originating PE transducer. However, some of the energy can pass through the partial reflectors and reach distal surfaces on the opposite side of the touch surface, where they can reflect back and be detected at the originating PE transducer. The energy levels of those two reflections can be captured and stored as baseline no-touch reflected energy levels. Reflected energy levels consistent with the stored baseline can indicate that no touch is present. However, if an object is present, some of the energy of the ultrasonic waves will be absorbed by the object. Depending on where the object is located (before or after the partial reflector), the energy levels of both reflections will vary, and depending on the energy levels of the reflections, the presence and location of the touching object (either before or after the partial reflector) can be determined.

In some embodiments, the piezoelectric transducers can be configured for passive sensing which means that all the PE transducers will operate in "listening-only" mode and none of them will be driven with any signal. A touching object generates time-varying stress on the touch surface and can cause acoustic waves to propagate within the touch surface. In one example, various gestures can be performed at different locations on the touch surface, and the TOF between the location of touch gesture and each of the PE transducers can be used to triangulate the touch location. For this approach, the texture of the touch surface can be configured to enhance the detection of gestures on the touch surface. This method requires that the PE transducers be placed at appropriate distances to capture various phases of the acoustic wave.

In another example, the PE transducers can be configured to detect low frequency signals (e.g., infrasonic frequencies below about 20 Hz) generated by slowing time-varying stresses in the touch surface of the device due to a touch on the touch surface. In this example, various gestures can be performed at different locations on the touch surface, and a map of the peak signal received at each of a plurality of PE transducers while the gestures are being performed can be generated and used to produce a quasi-static stress "signature" of various gestures and gesture locations for training a touch detection algorithm. After this training is complete, PE transducers can be configured to analyze the stress produced by a touch gesture at different locations on the touch surface and detect touch at these locations.

Figure 1B:
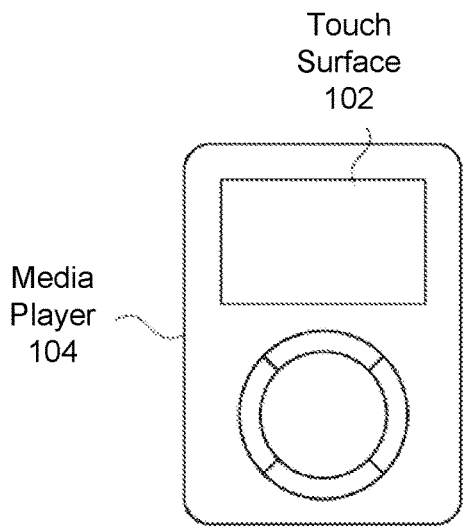
Figure 1C:
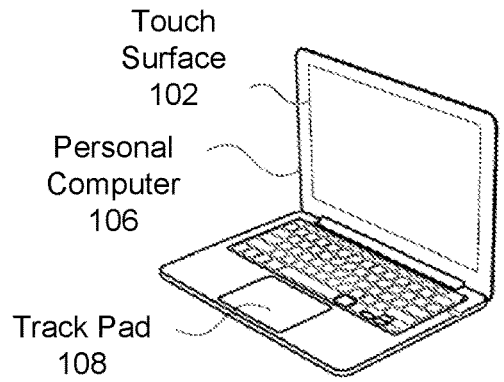
Figure 1D:
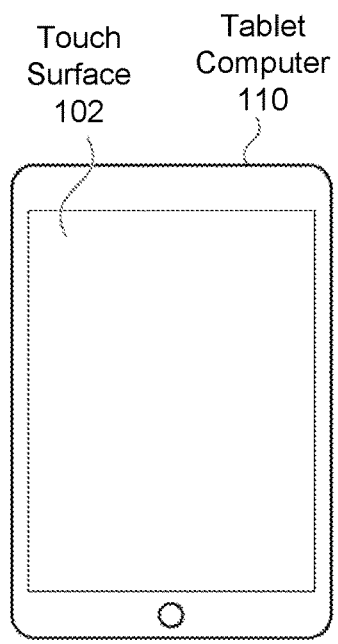
Figure 1E:
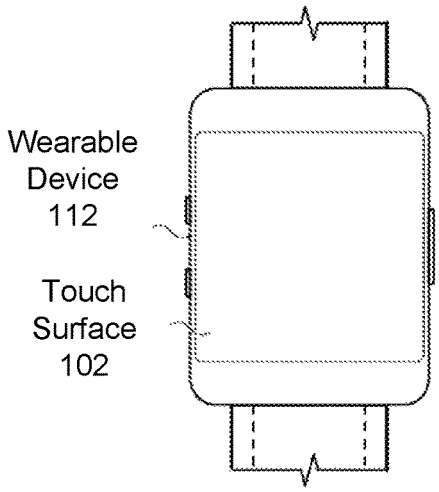
Figure 1F:
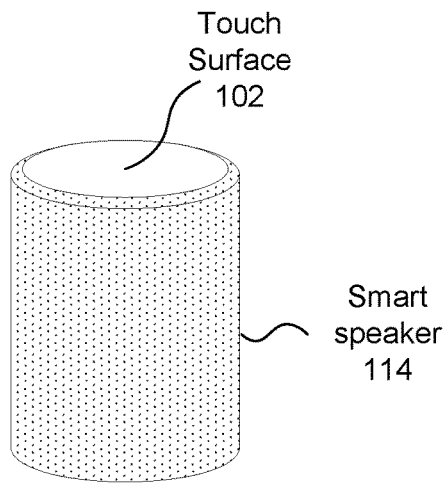
Figure 1G:
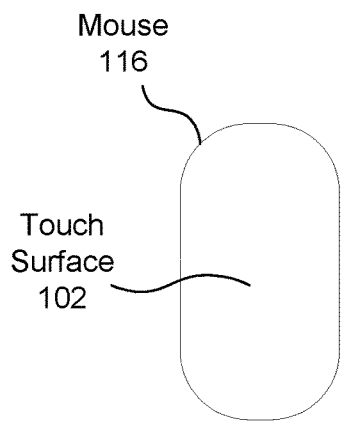
Figure 1H:
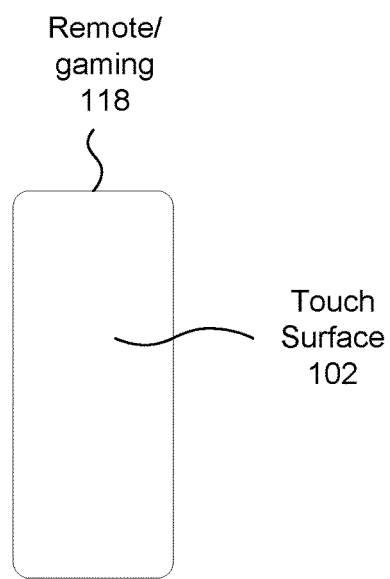
Figure 1I:
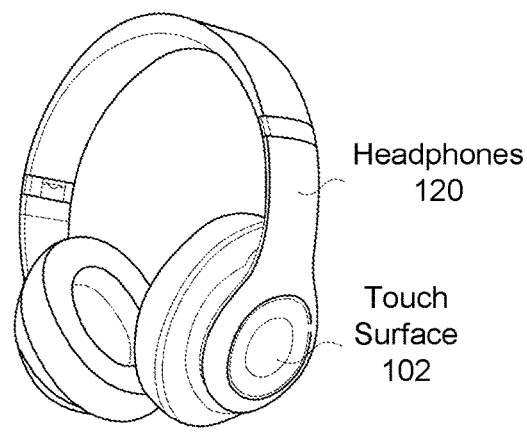

FIGS. 1A-1I illustrate systems in which one or more piezoelectric transducers located along a perimeter of a touch surface can be employed for touch detection according to examples of the disclosure. FIG. 1A illustrates mobile telephone 100 that includes touch surface 102 and one or more piezoelectric transducers located along a perimeter of the touch surface for touch detection according to examples of the disclosure. FIG. 1B illustrates digital media player 104 that includes touch surface 102 and one or more piezoelectric transducers located along a perimeter of the touch surface for touch detection according to examples of the disclosure. FIG. 1C illustrates personal computer 106 that includes a trackpad 108 and touch surface 102, each of which may include one or more piezoelectric transducers located along a perimeter of the touch surface for touch detection according to examples of the disclosure. FIG. 1D illustrates tablet computer 110 that includes touch surface 102 and one or more piezoelectric transducers located along a perimeter of the touch surface for touch detection according to examples of the disclosure. FIG. 1E illustrates wearable device 112 (e.g., a watch) that includes touch surface 102 and one or more piezoelectric transducers located along a perimeter of the touch surface for touch detection according to examples of the disclosure. FIG. 1F illustrates smart speaker 114 that includes touch surface 102 and one or more piezoelectric transducers located along a perimeter of the touch surface for touch detection according to examples of the disclosure. FIG. 1G illustrates mouse 116 that includes touch surface 102 and one or more piezoelectric transducers located along a perimeter of the touch surface for touch detection according to examples of the disclosure. FIG. 1H illustrates remote/gaming device 118 that includes touch surface 102 and one or more piezoelectric transducers located along a perimeter of the touch surface for touch detection according to examples of the disclosure. FIG. 1I illustrates headphones 120 that includes touch surface 102 and one or more piezoelectric transducers located along a perimeter of the touch surface for touch detection according to examples of the disclosure. It is understood that touch surface 102 and one or more piezoelectric transducers for touch detection can be implemented in other devices as well. It should also be understood that in various examples, the one or more piezoelectric transducers can be employed in conjunction with touch surface 102 that includes a corresponding display (e.g., a touch screen), a touch surface that does not include a corresponding display (e.g., a trackpad or other non-display touch surface), or without any touch surface at all (e.g., without a capacitive touch sensor array).

In some examples, touch surface 102 can be based on self-capacitance, or be configurable to operate, at times, as self-capacitance touch systems. A self-capacitance based touch system can include a matrix of small, individual plates of conductive material or groups of individual plates of conductive material forming larger conductive regions that can be referred to as touch node electrodes. For example, a touch screen can include a plurality of individual touch node electrodes, each touch node electrode identifying or representing a unique location (e.g., a touch node) on the touch screen at which touch or proximity is to be sensed, and each touch node electrode being electrically isolated from the other touch node electrodes in the touch screen/panel. Such a touch screen can be referred to as a pixelated self-capacitance touch screen, though it is understood that in some examples, the touch node electrodes on the touch screen can be used to perform scans other than self-capacitance scans on the touch screen (e.g., mutual capacitance scans). During operation, a touch node electrode can be stimulated with an AC waveform, and the self-capacitance to ground of the touch node electrode can be measured. As an object approaches the touch node electrode, the self-capacitance to ground of the touch node electrode can change (e.g., increase). This change in the self-capacitance of the touch node electrode can be detected and measured by the touch sensing system to determine the positions of multiple objects when they touch, or come in proximity to, the touch screen. In some examples, the touch node electrodes of a self-capacitance based touch system can be formed from rows and columns of conductive material, and changes in the self-capacitance to ground of the rows and columns can be detected, similar to above. In some examples, a touch screen can be multi-touch, single touch, projection scan, full-imaging multi-touch, capacitive touch, etc.

In some examples, touch surface 102 can be based on mutual capacitance, or be configurable to operate, at times, as mutual-capacitance touch systems. A mutual capacitance based touch system can include electrodes arranged as drive and sense lines that may cross over each other on different layers, or may be adjacent to each other on the same layer. The crossing or adjacent locations can form touch nodes. During operation, the drive line can be stimulated with an AC waveform and the mutual capacitance of the touch node can be measured. As an object approaches the touch node, the mutual capacitance of the touch node can change (e.g., decrease). This change in the mutual capacitance of the touch node can be detected and measured by the touch sensing system to determine the positions of multiple objects when they touch, or come in proximity to, the touch screen. As described herein, in some examples, a mutual capacitance based touch system can form touch nodes from a matrix of small, individual plates of conductive material.

In some examples, touch surface 102 can be based on mutual capacitance and/or self-capacitance. The electrodes can be arranged as a matrix of small, individual plates of conductive material or as drive lines and sense lines, or in another pattern. The electrodes can be configurable for mutual capacitance or self-capacitance sensing or a combination of mutual and self-capacitance sensing, or they can be configured to operate as mutual or self capacitance sensors at different times. For example, in one mode of operation, electrodes can be configured to sense mutual capacitance between electrodes, and in a different mode of operation electrodes can be configured (in some instances at different times in a scan plan) to sense self-capacitance of electrodes. In some examples, some of the electrodes can be configured to sense mutual capacitance therebetween and some of the electrodes can be configured to sense self-capacitance at the same time.

Figure 2:
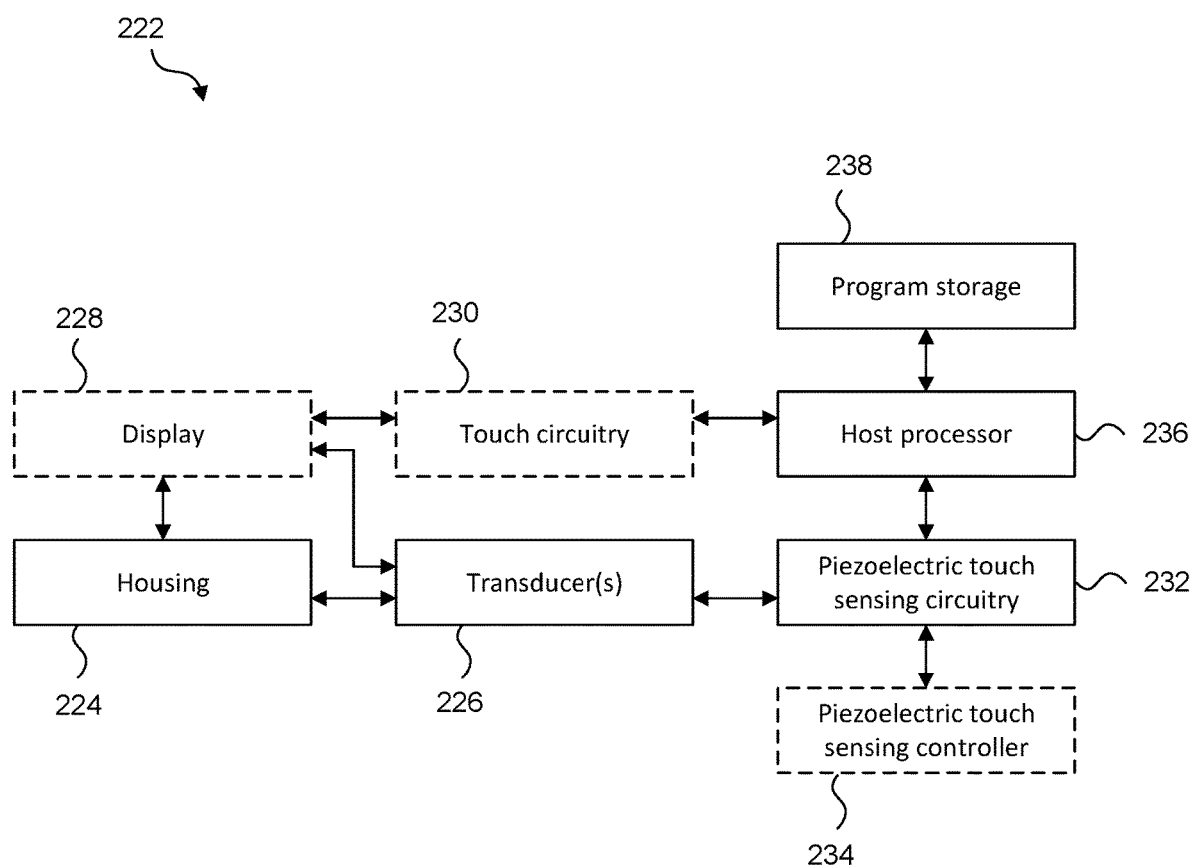
FIG. 2 illustrates a block diagram of an electronic device including piezoelectric transducers located along a perimeter of a touch surface for touch detection according to examples of the disclosure.

FIG. 2 illustrates a block diagram of an electronic device 222 including piezoelectric transducers located along a perimeter of a touch surface for touch detection according to examples of the disclosure. In some examples, housing 224 (e.g., corresponding to devices 100, 104, 106, 110, 112, 114, 116, 118 and 120 above) can be coupled (e.g., mechanically) with one or more ultrasonic transducers 226. In some examples, transducers 226 can be an array of piezoelectric transducers, which can be made to vibrate by the application of electrical signals when acting as a transmitter, and generate electrical signals based on detected vibrations when acting as a receiver. In some examples, transducers 226 can be formed from a piezoelectric ceramic material (e.g., lead zirconate titanate (PZT) or potassium-sodium niobate (KNN)) or a piezoelectric plastic material (e.g., polyvinylidene fluoride (PVDF) or poly-1-lactic acid (PLLA)). In various examples, transducers 226 can be attached to a flex circuit which is then bonded to housing 224, or affixed directly to the housing by a bonding agent (e.g., a composite epoxy), deposited on one or more surfaces through processes such as deposition, lithography, or the like, or integrally formed within the housing. When electrical energy is applied to transducers 226 and causes them to vibrate, the one or more surfaces in contact with the transducers can also be caused to vibrate, and the vibrations of the molecules of the surface material can propagate as an ultrasonic wave through the one or more surfaces/materials. In some examples, vibration of transducers 226 can be used to produce ultrasonic waves at a selected frequency in the medium of the surface of the electronic device.

In some examples, transducers 226 can be positional partially or completely around an optional display 228, which in some examples can be integrated with additional (non-ultrasonic) touch circuitry 230 to a form touch screen, although it should be understood that some example devices do not include either a display 228 or additional touch circuitry 230 (their optional nature indicated by dashed lines). Device 222 can further include piezoelectric touch sensing circuitry 232, which can perform touch sensing and imaging and can include circuitry (e.g., transmit circuitry) for driving electrical signals to stimulate vibration of transducers 226, as well as circuitry (e.g., receive circuitry) for sensing electrical signals output by the transducers when the transducer is stimulated by received ultrasonic energy. In some examples, timing operations for piezoelectric touch sensing circuitry 232 can optionally be provided by a separate piezoelectric touch sensing controller 234 that can control the timing of operations by piezoelectric touch sensing circuitry 232, including touch sensing and imaging. In some examples, piezoelectric touch sensing controller 234 can be coupled between piezoelectric touch sensing circuitry 232 and host processor 236. In some examples, controller functions can be integrated with piezoelectric touch sensing circuitry 232 (e.g., on a single integrated circuit). Output data from piezoelectric touch sensing circuitry 232 can be output to host processor 236 for further processing to determine a location of an object contacting the device (e.g., the location of fingerprint ridges). In some examples, the processing for determining the location of the contacting object can be performed by piezoelectric touch sensing circuitry 232, piezoelectric touch sensing controller 234 or a separate sub-processor of device 222 (not shown).

Host processor 236 can receive ultrasonic and optionally other touch sensor outputs (e.g., capacitive) and non-touch sensor outputs and initiate or perform actions based on those sensor outputs. Host processor 236 can also be connected to program storage 238 and optionally to display 228. Host processor 236 can, for example, communicate with display 228 to generate an image on the display, such as an image of a user interface (UI), and can use piezoelectric touch sensing circuitry 232 (and, in some examples, their respective controllers) to detect a touch on or near display 228, such as a touch input and/or force input at the displayed UI. The touch input can be used by computer programs stored in program storage 238 to perform actions that can include, but are not limited to, secure authentication and access, moving an object such as a cursor or pointer, scrolling or panning, adjusting control settings, opening a file or document, viewing a menu, making a selection, executing instructions, operating a peripheral device connected to the host device, answering a telephone call, placing a telephone call, terminating a telephone call, changing the volume or audio settings, storing information related to telephone communications such as addresses, frequently dialed numbers, received calls, missed calls, logging onto a computer or a computer network, permitting authorized individuals access to restricted areas of the computer or computer network, loading a user profile associated with a user's preferred arrangement of the computer desktop, permitting access to web content, launching a particular program, encrypting or decoding a message, and/or the like. Host processor 236 can also perform additional functions that may not be related to touch processing.

Note that one or more of the functions described herein can be performed by firmware stored in memory and executed by piezoelectric touch sensing circuitry 232 (or their respective controllers), and in some examples, touch circuitry 230, or stored in program storage 238 and executed by host processor 236. The firmware can also be stored and/or transported within any non-transitory computer-readable storage medium for use by or in connection with an instruction execution system, apparatus, or device, such as a computer-based system, processor-containing system, or other system that can fetch the instructions from the instruction execution system, apparatus, or device and execute the instructions. In the context of this document, a "non-transitory computer-readable storage medium" can be any medium (excluding a signal) that can contain or store the program for use by or in connection with the instruction execution system, apparatus, or device. The non-transitory computer readable medium storage can include, but is not limited to, an electronic, magnetic, optical, electromagnetic, infrared, or semiconductor system, apparatus or device, a portable computer diskette (magnetic), a random access memory (RAM) (magnetic), a read-only memory (ROM) (magnetic), an erasable programmable read-only memory (EPROM) (magnetic), a portable optical disc such a CD, CD-R, CD-RW, DVD, DVD-R, or DVD-RW, or flash memory such as compact flash cards, secured digital cards, USB memory devices, memory sticks, and the like.

The firmware can also be propagated within any transport medium for use by or in connection with an instruction execution system, apparatus, or device, such as a computer-based system, processor-containing system, or other system that can fetch the instructions from the instruction execution system, apparatus, or device and execute the instructions. In the context of this document, a "transport medium" can be any medium that can communicate, propagate or transport the program for use by or in connection with the instruction execution system, apparatus, or device. The transport readable medium can include, but is not limited to, an electronic, magnetic, optical, electromagnetic or infrared wired or wireless propagation medium.

It is to be understood that device 222 is not limited to the components and configuration of FIG. 2, but can include other or additional components in multiple configurations according to various examples. Additionally, the components of device 222 can be included within a single device, or can be distributed between multiple devices. Additionally, it should be understood that the connections between the components is exemplary and different unidirectional or bidirectional connections can be included between the components depending on the implementation, irrespective of the arrows shown in the configuration of FIG. 2.

Figure 3A:
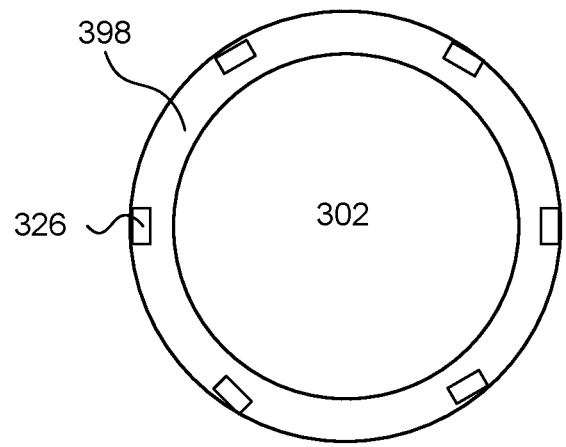
FIG. 3A illustrates a plurality of PE transducers around a perimeter of a touch surface according to examples of the disclosure.

FIG. 3A illustrates a plurality of PE transducers 326 around a perimeter of a touch surface 302 according to examples of the disclosure. In the example of FIG. 3A, PE transducers 326 are located on a symbolic ring 398, which in various embodiments can be a flex circuit or the actual housing of touch surface 302. In some examples, PE transducers 326 can be formed from a piezoelectric ceramic material (e.g., PZT or KNN), a piezoelectric plastic material (e.g., PVDF or PLLA), or barium titanate. Because PE transducers 326 rely upon the propagation of ultrasonic waves through a medium such as touch surface 302, they need not be present across the entire area of the touch surface, but instead can be located around the perimeter, and can be located below relative thick touch surface materials, and used with curved or flat touch surfaces. Piezoelectric touch sensing can also more accurately detect touches from wet or gloved fingers. Thus, increased touch surface size only causes the number of PE transducers 326 to scale circumferentially, resulting in less of an increase in cost, power and complexity. Furthermore, because PE transducers 326 only respond to touching objects and not hovering objects, hovering objects do not cause false touch detections. In addition, because PE transducers 326 are located on the perimeter of touch surface 302, there is no need for any PE transducers to be located within the touch surface, and complex assemblies such as integrated display and capacitive touch sensing stackups can be developed, fabricated, and installed without introducing additional complexity. Although FIG. 3A illustrates a circular ring 398 and therefore a circular arrangement of PE transducers 326, it should be understood that a circular touch surface shape is only an example, and that other touch surface shapes and corresponding rings (e.g., oval, polygonal, etc.) can be employed. In addition, a fully circumferential ring and PE transducer 326 arrangement is not always required, and in other examples, partially circumferential shapes and partially circumferential PE transducer arrangements can also be employed.

In some examples, touch surface 302 can be merely a surface that is intended to be touched, but without any touch sensing capability, and PE transducers 326 surrounding the touch surface can be relied upon for touch sensing. However, in other examples, touch surface 302 can include touch sensing capability, such as an array of capacitive touch sensors. In such an example, the piezoelectric touch sensing provided by PE transducers 326 can complement the capacitive touch sensing provided by the capacitive touch sensors. For example, in certain applications, there may be a benefit in detecting the approach of a finger (e.g., a hovering finger) before the actual touch is detected. For example, a UI can be displayed, touch sensing modes can be activated, and certain applications can be launched, all prior to the detection of a touch. In such an example, the capacitive touch sensors can provide a coarse indication of an approaching object, and possibly an inconclusive indication of touch. The piezoelectric touch sensing provided by PE transducers 326 can confirm (or deny) the indication of touch.

Figure 3B:
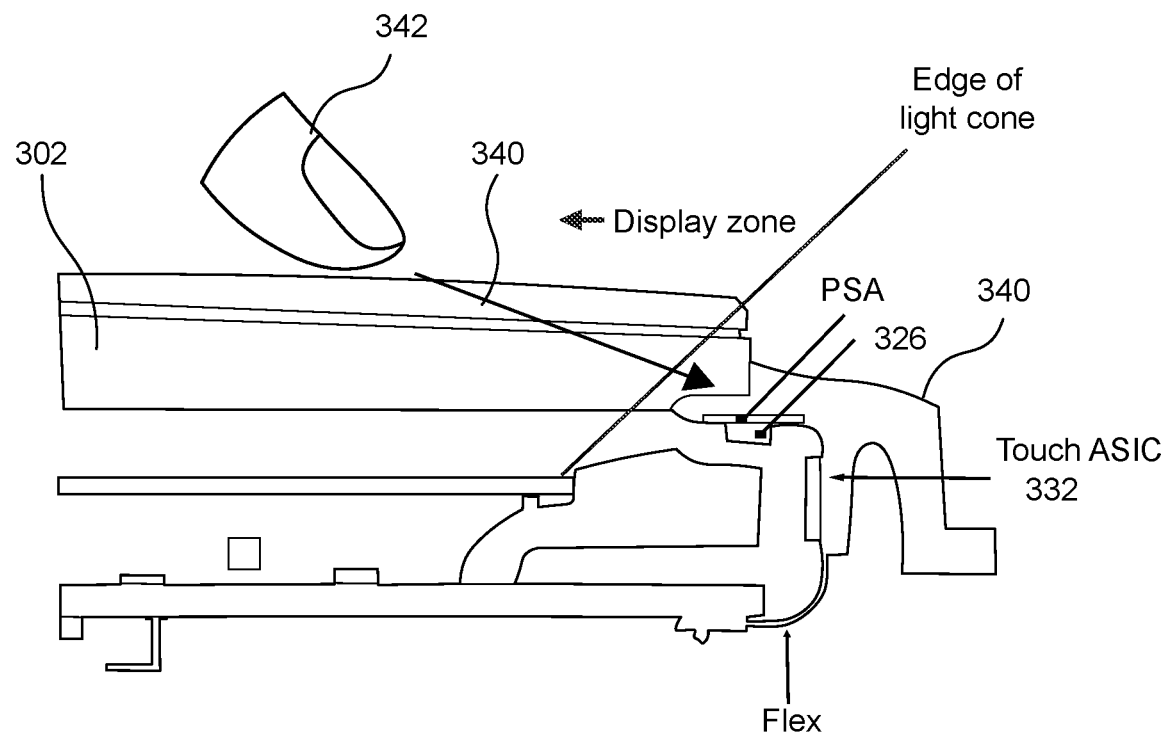
FIG. 3B illustrates a partial cross-sectional view of a plurality of PE transducers around a perimeter of a touch surface according to examples of the disclosure.

FIG. 3B illustrates a partial cross-sectional view of a plurality of PE transducers 326 around a perimeter of a touch surface 302 according to examples of the disclosure. In the example of FIG. 3B, PE transducer 326 is adhered to housing 340 using PSA, and is located along a perimeter of touch surface 302. Object 342 (e.g., a finger) is in contact with touch surface 302 (via optional intervening coatings), and therefore ultrasonic waves generated by PE transducer 326 can reflect off the interface between object 342 and touch surface 302, or conversely a touch from the object can produce low frequency waves that can be detected by the PE transducer. Touch ASIC 332 can optionally control the configuration and generation of ultrasonic waves by PE transducer 326, and control the detection of waves at the PE transducer, in addition to controlling other touch sensing mechanisms such as a capacitive touch sensing array.

Figure 4A:
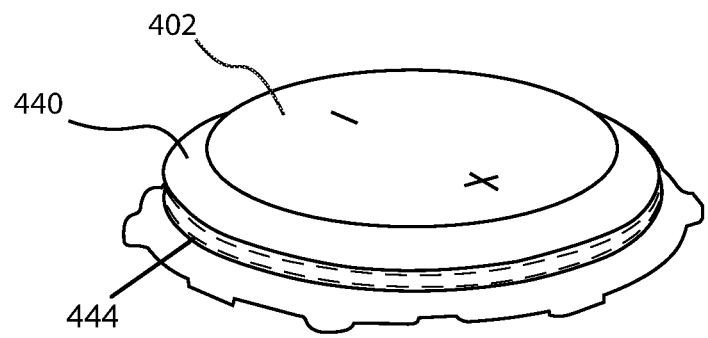
FIG. 4A illustrates a perspective view of a housing, touch surface, and a symbolically illustrated region on the outside of the housing at which one or more PE transducers can be located according to examples of the disclosure.

FIG. 4A illustrates a perspective view of housing 440, touch surface 402, and a symbolically illustrated region 444 on the outside of the housing at which one or more PE transducers can be located according to examples of the disclosure.

Figure 4B:
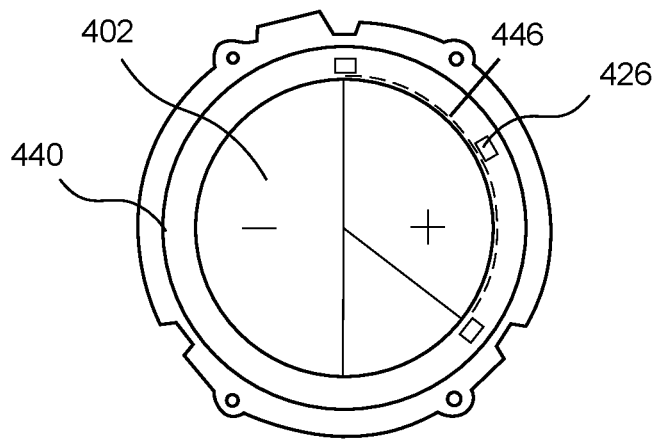
FIG. 4B illustrates a top view of a housing, touch surface, and the placement of three PE transducers according to examples of the disclosure.

FIG. 4B illustrates a top view of housing 440, touch surface 402, and the placement of three PE transducers 426 according to examples of the disclosure. The example of FIG. 4B illustrates that PE transducers 426 (and in some examples, a corresponding flex circuit) need not be formed entirely around touch surface 402, but instead can be only around a portion of the touch surface, as indicated by the 120 degree arc at 446.

Figure 4C:
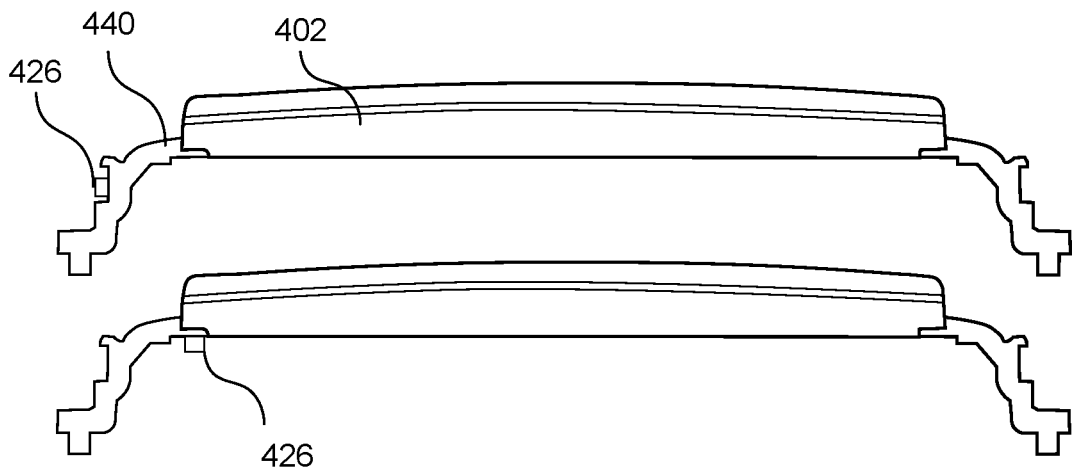
FIG. 4C illustrates a cross-sectional view of two examples of a housing, touch surface, and PE transducers according to examples of the disclosure.

FIG. 4C illustrates a cross-sectional view of two examples of housing 440, touch surface 402, and PE transducers 426 according to examples of the disclosure. The upper cross-sectional view in FIG. 4C corresponds to FIGS. 4A and 4B. The lower cross-sectional view in FIG. 4C corresponds to an alternative arrangement discussed hereinbelow, where transducer 426 is located on the inside of housing 440.

As discussed above, PE transducers 426 can be placed around the entire perimeter of touch surface 402, but to keep costs down, for example, piezoelectric touch sensing can be achieved with fewer PE transducers 426 in a smaller arc.

Figure 5A:
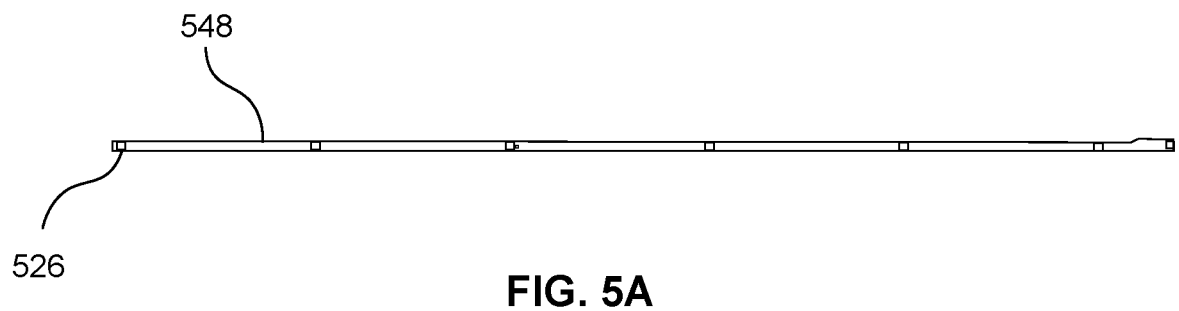
FIG. 5A illustrates a flex circuit containing PE transducers according to examples of the disclosure.

FIG. 5A illustrates a flex circuit 548 containing PE transducers 526 according to examples of the disclosure. The example of FIG. 5A corresponds to a flex circuit that could be bonded to the outside of a housing, as shown in FIGS. 4A and 4B, and the upper cross-sectional view in FIG. 4C. To bond PE transducers 526 in a ring on a flex circuit, a sample method would be to bond the PE transducers in a circular arrangement on a flat sheet of substrate material, and then remove the inner material and excess outer material. However, such a process could be wasteful of material. Accordingly, in some examples of the disclosure, PE transducers 526 are bonded on a linear flex circuit 548 to take advantage of panelization manufacturing techniques (e.g., form multiple flex circuits at the same time, then separate them later). Alignment issues can be reduced with straight-line assembly of PE transducers 526, and separation of individual flex circuits 548 can also be made simpler with straight-line manufacturing. Although FIG. 5A illustrates the attachment of PE transducers 526 with uniform spacing, in other examples non-uniform spacing may also be employed. In addition, although six PE transducers 526 are illustrated in the example of FIG. 5A, in other examples fewer PE transducers such as three transducers, or even one PE transducer with both transmit and receive capabilities, can also be used.

Figure 5B:
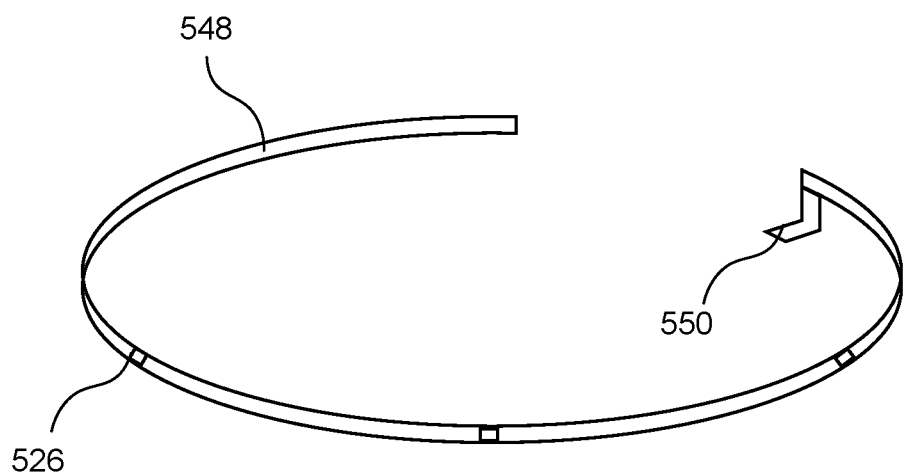
FIG. 5B illustrates a flex circuit after it has been bent into a semi-circular shape according to examples of the disclosure.

FIG. 5B illustrates flex circuit 548 after it has been bent into a semi-circular shape according to examples of the disclosure. Note that in the example of FIG. 5B, flex circuit 548 does not form a 360 degree loop or ring, but rather is only a partial circle. An end portion of flex circuit 548 has been bent into a tail at 550 for providing connections on and off the flex circuit. Flex circuit 548 can be formed from polyamide and copper, PET, or flexible plastic materials such as PVDF, which is also a piezo material. Accordingly, in some embodiments, the flex circuit 548 can be formed from PVDF. The PVDF can be isolated from the rest of the flex circuit at the locations where PE transducers are desired, and a ground, an electrode, and a connecting trace can be coupled to the isolated PE PVDF material to form PE transducer 526.

Figure 5C:
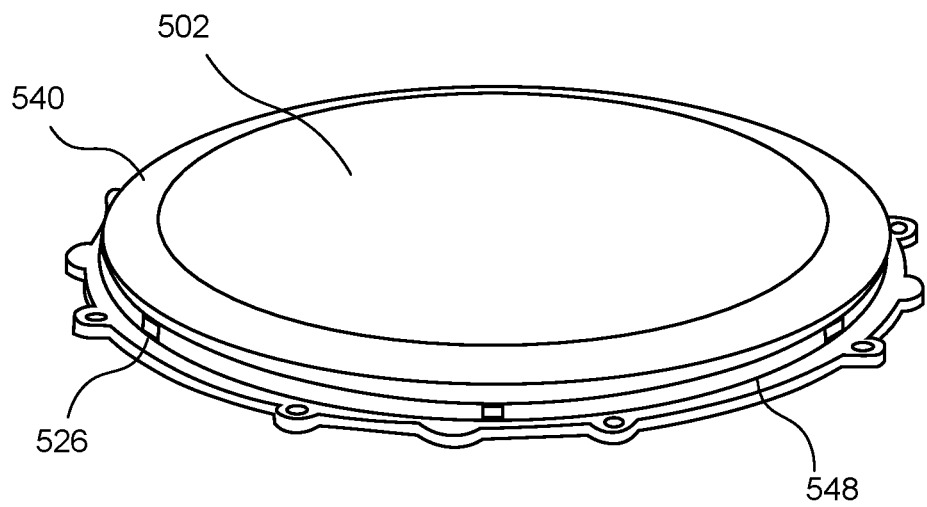
FIG. 5C illustrates a perspective view of a touch surface, a housing affixed to the touch surface, and a flex circuit with PE transducers attached to the outside of the housing according to examples of the disclosure.

FIG. 5C illustrates a perspective view of touch surface 502, housing 540 affixed to the touch surface, and flex circuit 548 with PE transducers 526 attached to the outside of the housing according to examples of the disclosure.

Figure 5D:
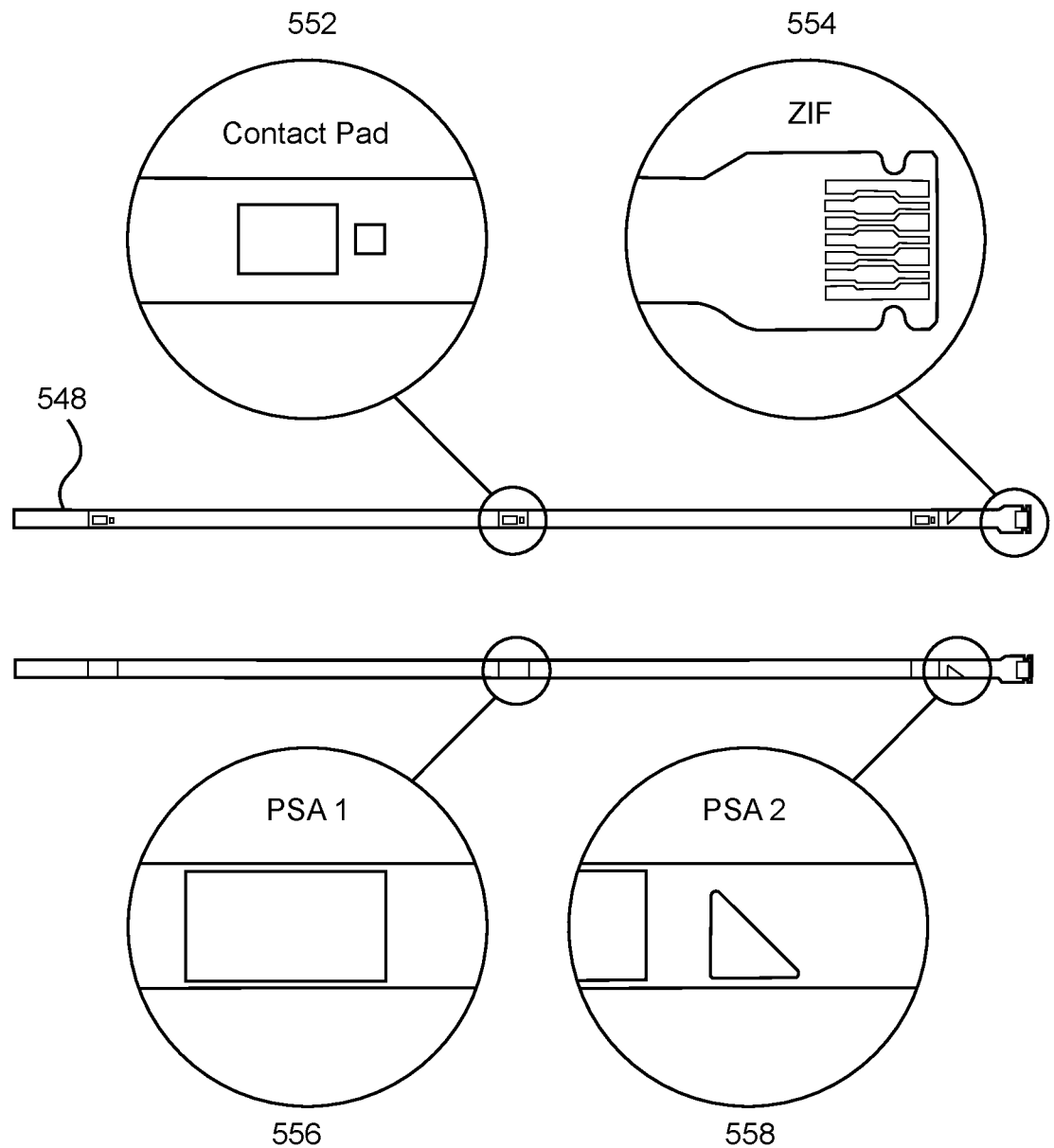
FIG. 5D illustrates a close-up view of a portion of a flex circuit showing a contact pad area, a ZIF connector area, a first pressure sensitive adhesive (PSA) area for adhering the flex circuit to a housing, and a second PSA area for folding and adhering the flex circuit onto itself according to examples of the disclosure.

FIG. 5D illustrates a close-up view of a portion of flex circuit 548 showing contact pad area 552, ZIF connector area 554, a first pressure sensitive adhesive (PSA) area 556 for adhering the flex circuit to a housing, and a second PSA area 558 for folding and adhering the flex circuit onto itself according to examples of the disclosure. In the example of FIG. 5D, one side of flex circuit 548 can include contact pad 552. At a distal end of the flex circuit a zero insertion force (ZIF) connector area 554 can be formed. On the other side of flex circuit 548, and in some examples in the same area of contact pad 552, a first area of PSA 556 can be formed. Near the distal end of flex circuit 548, a second triangular area of PSA 558 can be formed in an arrangement that allows the flex circuit to be folded onto itself and adhered at a right angle, as shown at 550 in FIG. 5B.

Figure 6A:
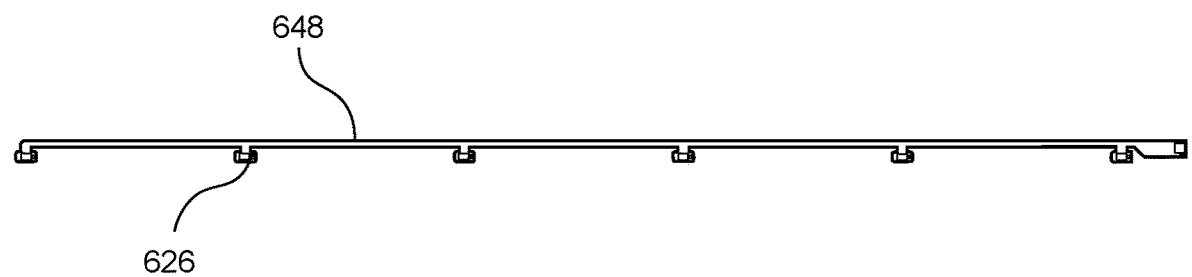
FIG. 6A illustrates a flex circuit containing PE transducers according to examples of the disclosure.

FIG. 6A illustrates a flex circuit 648 containing PE transducers 626 according to examples of the disclosure. The example of FIG. 6A corresponds to a flex circuit that could be bonded to the inside of a housing, as shown in the lower cross-sectional view in FIG. 4C. Although FIG. 6A illustrates the attachment of PE transducers 626 with uniform spacing, in other examples non-uniform spacing may also be employed. In addition, although six PE transducers 626 are illustrated in the example of FIG. 6A, in other examples fewer PE transducers such as three transducers, or even one PE transducer with both transmit and receive capabilities, can also be used.

Figure 6B:
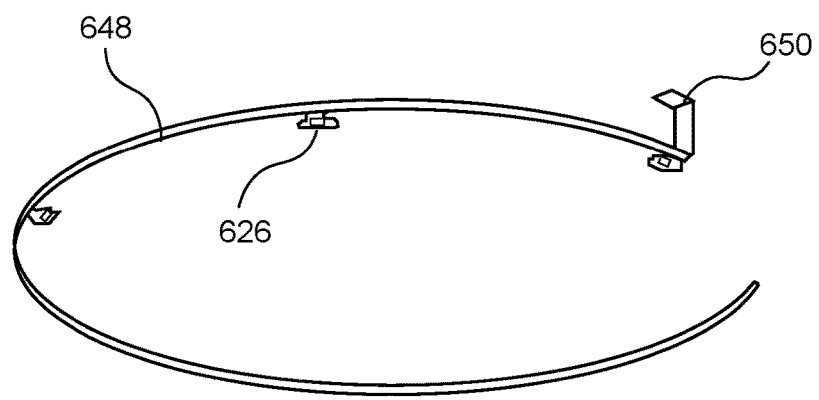
FIG. 6B illustrates a flex circuit after it has been bent into a semi-circular shape according to examples of the disclosure.

FIG. 6B illustrates flex circuit 648 after it has been bent into a semi-circular shape according to examples of the disclosure. Note that in the example of FIG. 6B, flex circuit 648 does not form a 360 degree loop or ring, but rather is only a partial circle. However, in some examples, flex circuit 648 may form a 360 degree loop. An end portion of flex circuit 648 has been bent into a tail at 650 for providing connections on and off the flex circuit. Flex circuit 648 can be formed from polyamide and copper, PET, or flexible plastic materials such as PVDF, which is also a piezo material. Accordingly, in some embodiments, the entire flex circuit 648 can be formed from PVDF. The PVDF can be isolated from the rest of the flex circuit at the locations where PE transducers are desired, and a ground, an electrode, and a connecting trace can be coupled to the isolated PE PVDF material to form PE transducer 626.

Figure 6C:
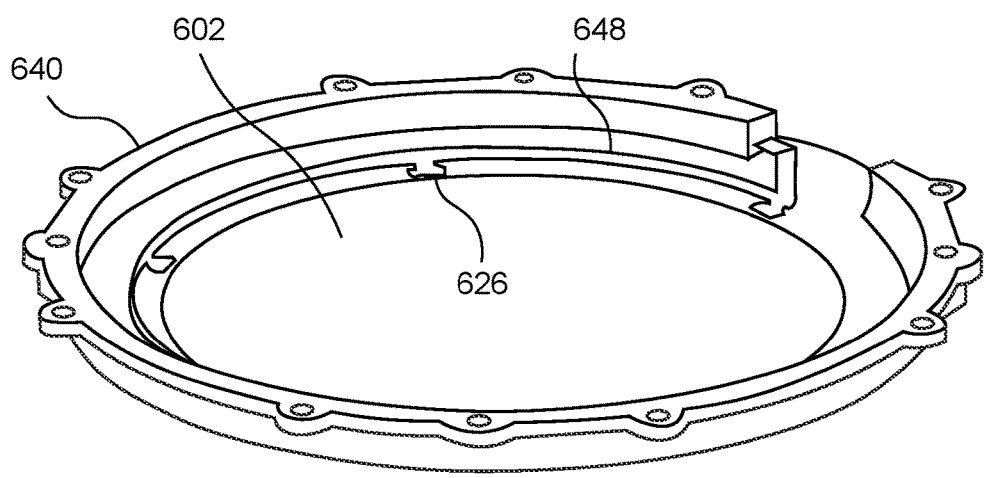
FIG. 6C illustrates a perspective view of a touch surface, a housing affixed to the touch surface, and a flex circuit with PE transducers attached to the inside of the housing according to examples of the disclosure.

FIG. 6C illustrates a perspective view of touch surface 602, housing 640 affixed to the touch surface, and flex circuit 648 with PE transducers 626 attached to the inside of the housing according to examples of the disclosure.

Figure 6D:
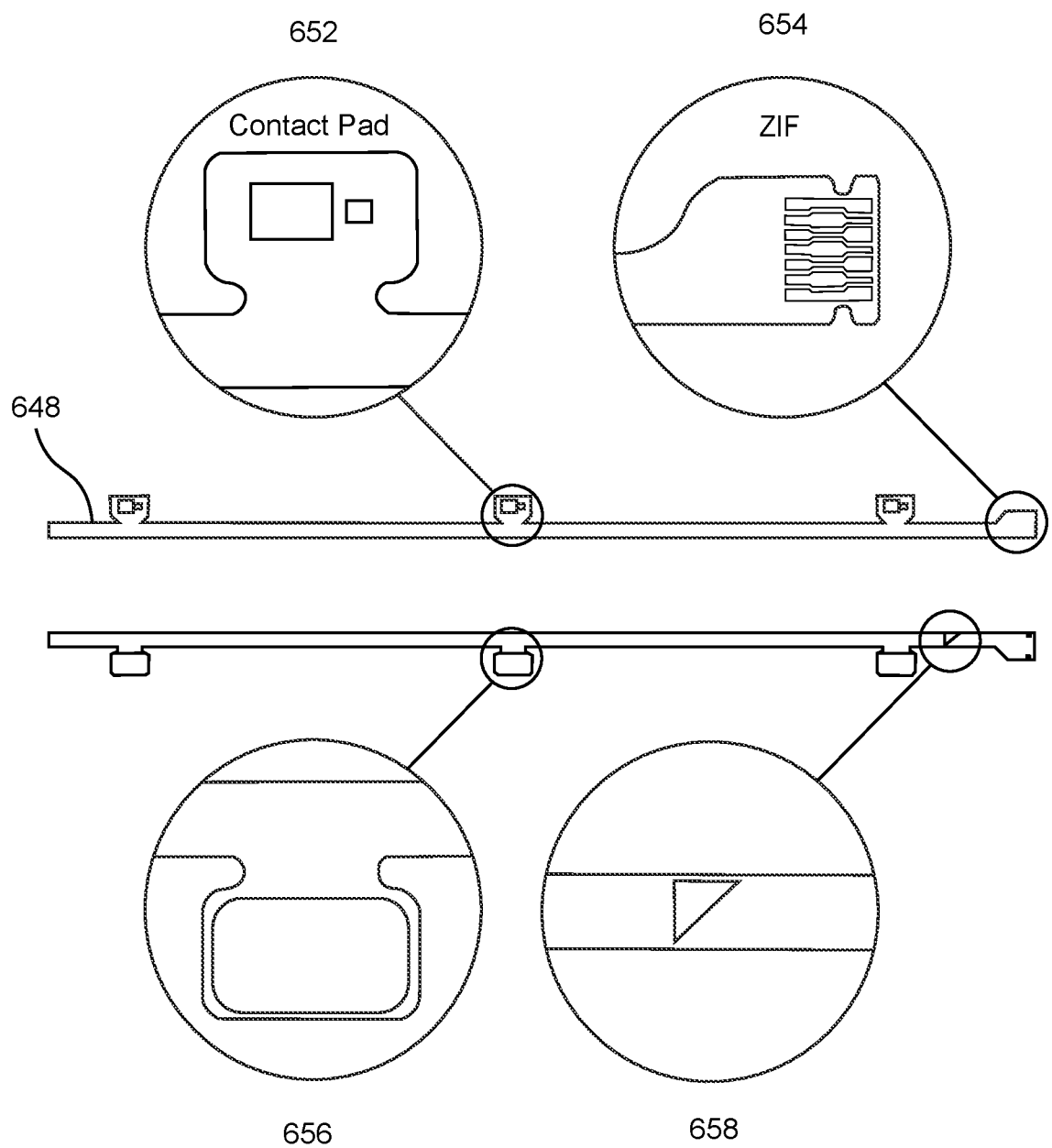
FIG. 6D illustrates a close-up view of a portion of a flex circuit showing a contact pad area, a ZIF connector area, a first pressure sensitive adhesive (PSA) area for adhering the flex circuit to a housing, and a second PSA area for folding and adhering the flex circuit onto itself according to examples of the disclosure.

FIG. 6D illustrates a close-up view of a portion of flex circuit 648 showing contact pad area 652, ZIF connector area 654, a first pressure sensitive adhesive (PSA) area 656 for adhering the flex circuit to a housing, and a second PSA area 658 for folding and adhering the flex circuit onto itself according to examples of the disclosure. In the example of FIG. 6D, one side of flex circuit 648 can include contact pad 652, which extends beyond the flex circuit and forms a tab. At a distal end of the flex circuit, a ZIF connector area 654 can be formed. On the other side of flex circuit 648, and in some examples in the same area of contact pad 652, a first area of PSA 656 can be formed. Near the distal end of flex circuit 648, a second triangular area of PSA 658 can be formed in an arrangement that allows the flex circuit to be folded onto itself and adhered at a right angle, as shown at 550 in FIG. 5B.

In the preceding paragraphs, various arrangements of PE transducers partially or fully encircling a touch surface (with or without a separate capacitive touch sensing array) have been disclosed. Each of the PE transducers can be configured using one or more of host processor 236, piezoelectric touch sensing circuitry 232, and piezoelectric touch sensing controller 234 to operate as a PE transmitter, a PE receiver, or a PE transceiver (that both transmits and receives ultrasonic waves). In some examples, each of a plurality of PE transmitters can be configured to transmit ultrasonic waves at different times at the same or different frequencies, or the plurality of PE transmitters can be configured to transmit ultrasonic waves at the same time at the same or different frequencies. In addition, each of a plurality of PE receivers can be configured to receive ultrasonic waves at the same time, or at different times, and each of a plurality of PE transceivers can be configured to both transmit ultrasonic waves and receive ultrasonic waves at the same time or at different times. In the following paragraphs, various ultrasonic sensing methods using the placement of PE transducers discussed above will be described.

In some embodiments, the PE transducers can be configured for active sensing, where at least one of the PE transducers is configured as a PE transmitter for transmitting ultrasonic waves, and one or more PE transducers are configured as PE receivers for receiving ultrasonic waves. In some examples of active sensing, at least one of the PE transducers can be configured as a PE transceiver for both transmitting and receiving ultrasonic waves. In some examples, the PE transducers can transmit ultrasonic waves in a frequency range of 100's of kHz to about 1 MHz, and can be configured as broadband PE transducers capable of generating an impulse response in the form of an ultrasonic guided wave (GW) at different frequencies at different times. The range of frequencies can depend on the thickness of the stackup of materials and the type of materials (and the resultant boundaries and acoustic impedances) through which the ultrasonic waves must propagate. If code-division multiple access (CDMA) principles are employed, some of the PE transducers can be configured to launch ultrasonic waves at different frequencies at the same time, and other PE transducers can be configured to receive ultrasonic waves at those frequencies. Using CDMA can improve the frame rate because the measurements can be performed at the same time, and can also reduce the total power consumption during the scan due to the reduction in the overall scan time. In simplified embodiments of active scanning, an ultrasonic wave can be launched from one of the PE transducers at a single frequency, one set of PE transducers can be configured to receive direct or reflected ultrasonic waves at that frequency, then a different PE transducer can launch an ultrasonic wave at the single frequency, and another set of PE transducers can be configured to receive direct or reflected ultrasonic waves at that frequency, and this process can be repeated in a sequential fashion. These aforementioned capabilities can depend on the capabilities (or limitations) of ASIC 332 (see FIG. 3B) and one or more of host processor 236, piezoelectric touch sensing circuitry 232, and piezoelectric touch sensing controller 234 (see FIG. 2).

Figure 7A:
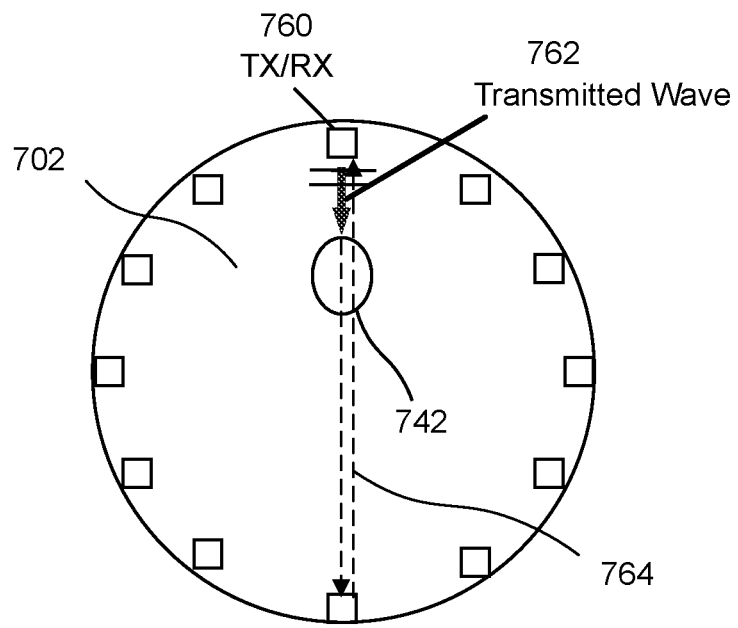
FIGS. 7A and 7B illustrate a first active sensing modality utilizing reflection and time-of-flight (TOF) principles according to some examples of the disclosure.
Figure 7B:
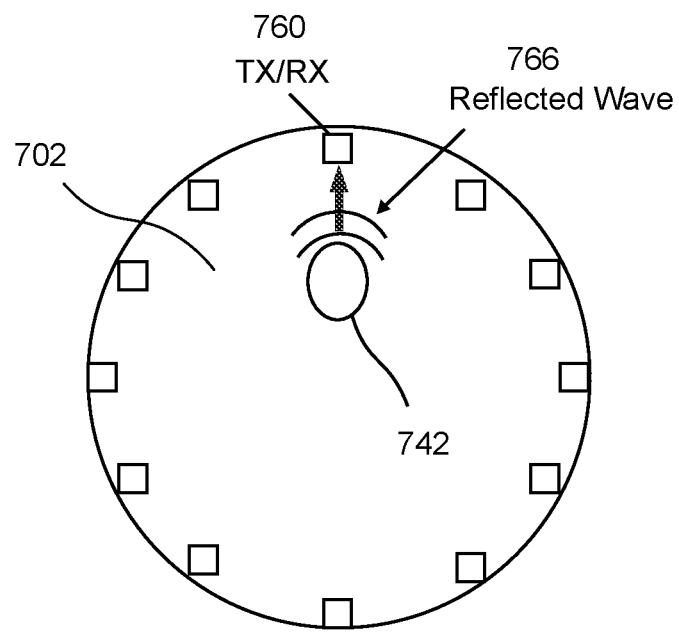

FIGS. 7A and 7B illustrate a first active sensing modality utilizing reflection and time-of-flight (TOF) principles according to some examples of the disclosure. In the example of FIGS. 7A and 7B, a PE transducer configured as a PE transceiver 760 can launch an ultrasonic wave 762 (solid black arrow) into touch surface 702. Note that although touch surface 702 is illustrated as a circular area in FIG. 7A, this shape is merely an example, and the touch surface can have other shapes. If no object is in contact with touch surface 702, ultrasonic wave 762 continues to a distal end of the touch surface (opposite that of PE transceiver 760) and reflects back to the PE transceiver as modified ultrasonic wave 764, as shown by the two dashed lines in FIG. 7A. Although ultrasonic wave 762 is only shown in FIG. 7A as propagating to the distal end of touch surface 702 for purposes of simplifying the figure, it should be understood that the ultrasonic wave propagates to other areas within the touch surface and to other PE transducers on the perimeter of the touch surface. A TOF measurement of this modified (e.g., reflected) ultrasonic wave 764 can be captured and stored as an indication of a no-touch condition. However, if an object (e.g., finger 742) is in contact with touch surface, an acoustic impedance mismatch between the finger and touch surface 702 is created, and the ultrasonic wave reflects back from the location of the object to PE transceiver 760 as modified ultrasonic wave 766 as shown in FIG. 7B. A TOF measurement of this reflected wave 766 can be captured. In some examples, by comparing the TOF measurement to a predetermined parameter (e.g., the predetermined no-touch TOF measurement), it can be determined that a touching object is present, and the location of that touching object can also be determined. In other examples, by utilizing the TOF measurement, the known speed of sound through the touch surface, and the known dimensions of the touch surface, it can be determined that a touching object is present, and the location of that touching object can also be determined.

Figure 8A:
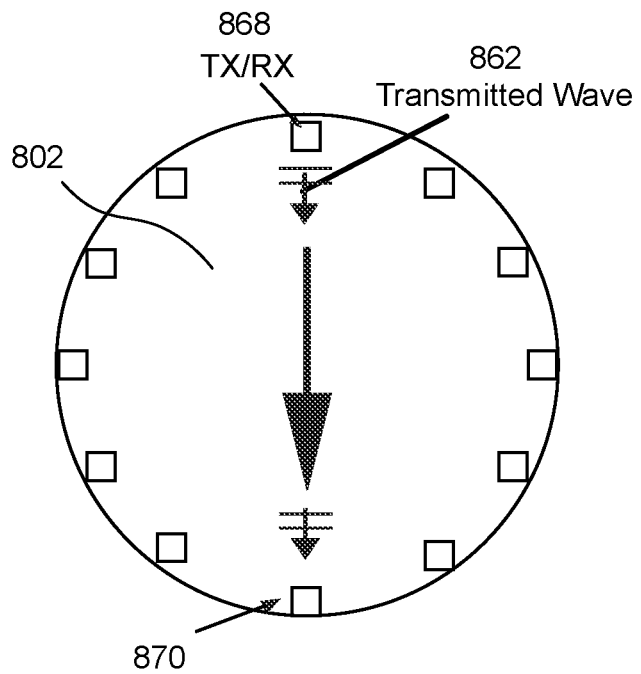
FIGS. 8A and 8B illustrate a second active sensing modality utilizing absorption (tomography) principles according to some examples of the disclosure.
Figure 8B:
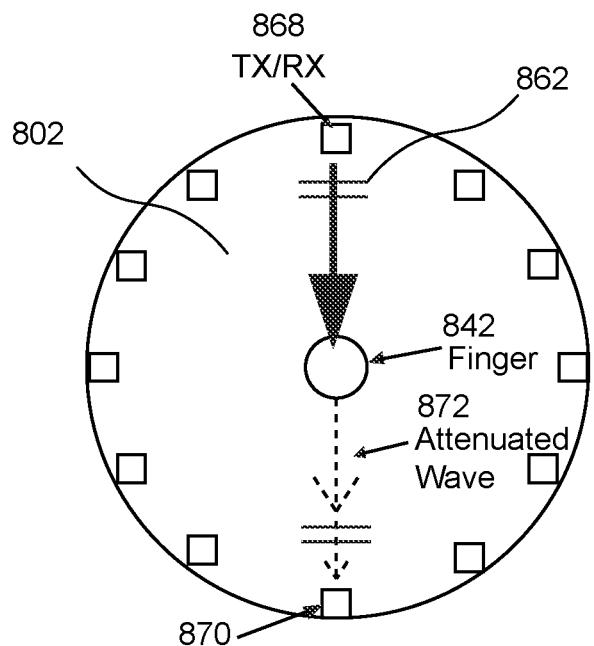

FIGS. 8A and 8B illustrate a second active sensing modality utilizing absorption (tomography) principles according to some examples of the disclosure. In the example of FIGS. 8A and 8B, a PE transducer configured as a PE transmitter 868 can launch an ultrasonic wave 862 (solid black arrow) into touch surface 802. Note that although touch surface 802 is illustrated as a circular area in FIG. 8A, this shape is merely an example, and the touch surface can have other shapes. If no object is in contact with touch surface 802, ultrasonic wave 862 continues to a distal end of the touch surface (opposite that of PE transmitter 868) where it is received at a PE transducer configured as a PE receiver 870. Although ultrasonic wave 862 is only shown in FIG. 8A as propagating to PE receiver 870 for purposes of simplifying the figure, it should be understood that the ultrasonic wave propagates to other areas within the touch surface and to other PE receivers on the perimeter of the touch surface. A measurement of the amplitude (energy) of ultrasonic wave 862 as it is received at PE receiver 870 can be captured and stored as an indication of a no-touch condition. However, if an object (e.g., finger 842) is in contact with touch surface as shown in FIG. 8B, some of the energy of ultrasonic wave 862 is absorbed by finger 842, and modified (e.g., attenuated) ultrasonic wave 872 of lower energy continues on and is received at PE receiver 870 (and other PE receivers). A measurement of the energy of attenuated wave 872 as it is received at PE receiver 870 (and optionally at other PE receivers) can be captured. Based on the energy measurement at PE receiver 870 (and optionally at other PE receivers), a comparison to a predetermined parameter (e.g., the no-touch energy measurement) can be made, and with an understanding of the locations of PE transmitter 868 and the PE receiver (and therefore the path of the wave from one to the other), it can be determined that a touching object is present, and the location of that touching object can also be determined.

In some examples, CDMA principles can be employed, and a plurality of PE transceivers can launch ultrasonic waves at different frequencies at the same time, while other PE transceivers can receive those ultrasonic waves at the different frequencies. Capturing multiple measurements of TOF or energy received as a result of ultrasonic waves transmitted from different locations around touch surface 802 and comparing those measurements to predetermined no-touch TOF or energy measurements can provide more accurate measurements of the location of a touching object and the contours of that object. In general, the resolution or accuracy of the location of the object depends on the frequency of the ultrasonic waves and the number and location of PE transducers involved in the measurements.

Although the first active sensing modality of FIGS. 7A and 7B and the second active sensing modality of FIGS. 8A and 8B have been separately described, in other embodiments both active sensing modalities can be employed within a single scan plan, such that active sensing based on reflections can be performed during a first time period, and active sensing based on absorption can be performed during a second time period. Advantages can be achieved by performing both types of active sensing. For example, active sensing using TOF measurements can provide increased touch location resolution, because of sampling rates that can be increased rather inexpensively. For example, TOF measurements sampled at a 5 MHz rate provide 20 ns of resolution, which provides 200 microns of resolution when converted to millimeters. On the other hand, active sensing using absorption principles can provide a higher signal-to-noise ratio (SNR) as compared to TOF measurements due to the absorption of energy by the object.

Figure 9A:
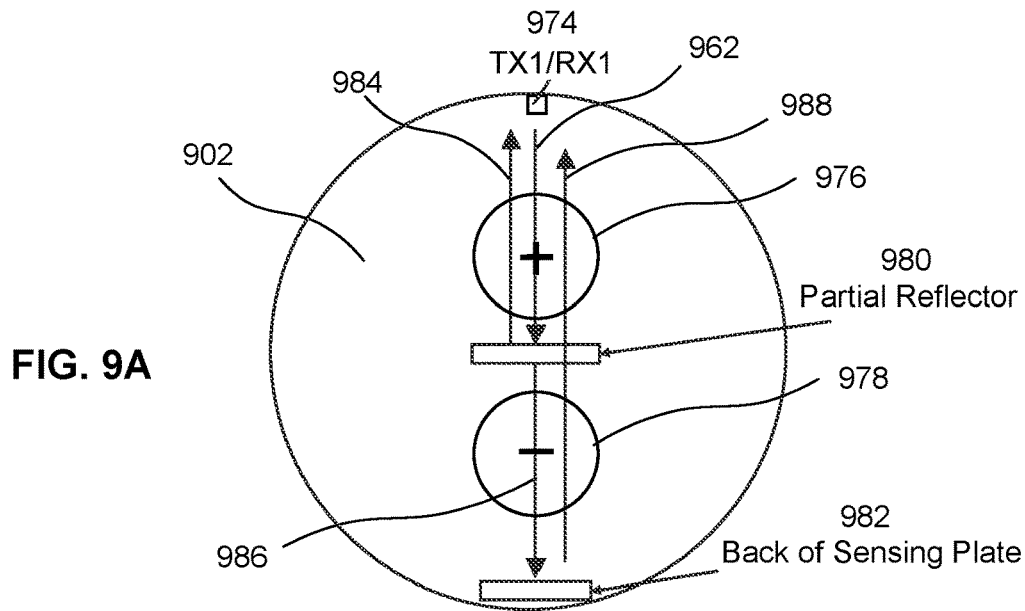
FIGS. 9A-9D illustrate a third active sensing modality utilizing absorption (tomography) principles to detect touches in various regions of a touch surface according to some examples of the disclosure.

FIGS. 9A-9D illustrate a third active sensing modality utilizing absorption (tomography) principles to detect touches in various regions of touch surface 902 according to some examples of the disclosure. In the example of FIG. 9A, a two pixel (plus/minus) input area is present (e.g., for controlling the volume of a device), where a touch at the "plus" virtual button 976 increases a parameter, while a touch at the "minus" virtual button 978 decreases a parameter. To separate these two regions for touch sensing, partial reflector 980 formed from a high acoustic impedance material can be attached to or formed within touch surface 902. In an alternative example, partial reflector 980 can be implemented as a notch in touch surface 902. In the example of FIG. 9A, PE transducer 974 can launch an ultrasonic wave 962 into touch surface 902. Note that although touch surface 902 is illustrated as a circular area in FIG. 9A, this shape is merely an example, and the touch surface can have other shapes. If no object is in contact with touch surface 902, a portion of ultrasonic wave 962 reflects off partial reflector 980 as shown at 984 and back to PE transducer 974, where its amplitude can be captured. A portion of ultrasonic wave 962 is attenuated but propagates through partial reflector 980 to a distal end of touch surface 902 (opposite that of PE transducer 974) as shown at 986, where it reflects off surface 982 as shown at 988 and back to PE transducer 974, where its amplitude can be captured. These two amplitudes can be saved as no-touch amplitudes.

If an object is contacting touch surface 902 at the location of "minus" virtual button 978, there will be no change in the amplitude of reflected wave 984 as it is received at PE transducer 974. However, some of the energy of wave 986 will be absorbed by the object, and thus the amplitude of reflected wave 988 as it is received at PE transducer 974 will be reduced or attenuated. If, on the other hand, an object is contacting touch surface 902 at the location of "plus" virtual button 976, some of the energy of ultrasonic wave 962 will be absorbed by the object, and thus the amplitude of reflected wave 984 as it is received at PE transducer 974 will be reduced or attenuated. In addition, the energy of propagating wave 986 will be reduced or attenuated, and thus the amplitude of reflected wave 984 as it is received at PE transducer 974 will also be reduced or attenuated.

Figure 9B:
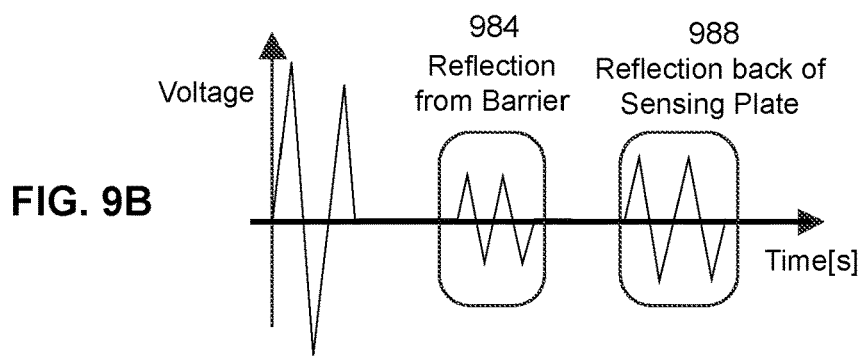
Figure 9C:
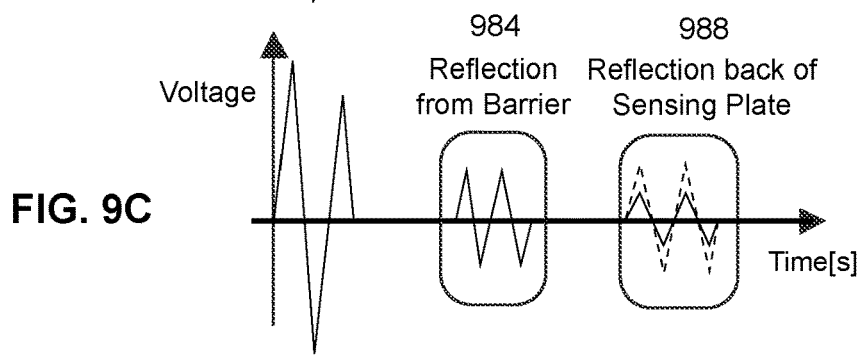
Figure 9D:
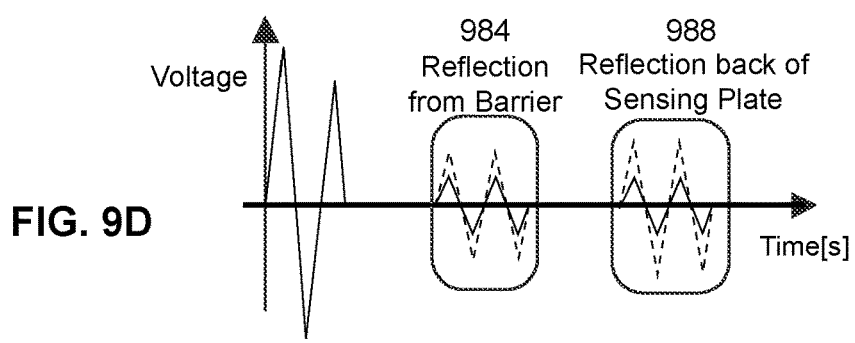

These three scenarios (no touch on either virtual button, a touch on the "minus" virtual button, and a touch on the "plus" virtual button) are illustrated in the example graphs of FIGS. 9B-9D, respectively. Note that the illustrated amplitudes are not to scale or proportional to one another. FIG. 9B illustrates the no-touch scenario with baseline amplitudes of reflected waves 984 and 988. FIG. 9C illustrates the scenario with a touch on the "minus" virtual button with a reduction in the amplitude of reflected wave 988, but not reflected wave 984. FIG. 9D illustrates the scenario with a touch on the "plus" virtual button with a reduction in the amplitudes of both reflected waves 984 and 988. These amplitude differences can be detected to determine the region of the touch. Although FIG. 9A illustrates only a single partial reflector 980, in other examples multiple partial reflectors can be formed in various directions (e.g., along the Y-axis and/or along the X-axis, or concentrically within the touch surface) to detect touches at a plurality of regions.

In some embodiments, the PE transducers can be configured for passive sensing. As with the active sensing modalities, the PE transducers in passive sensing can be arranged around a perimeter of a touch surface. However, rather than configuring one or more of the PE transducers to generate ultrasonic waves, in passive sensing the PE transducers are only configured as a PE receivers for receiving ultrasonic waves.

Figure 10:
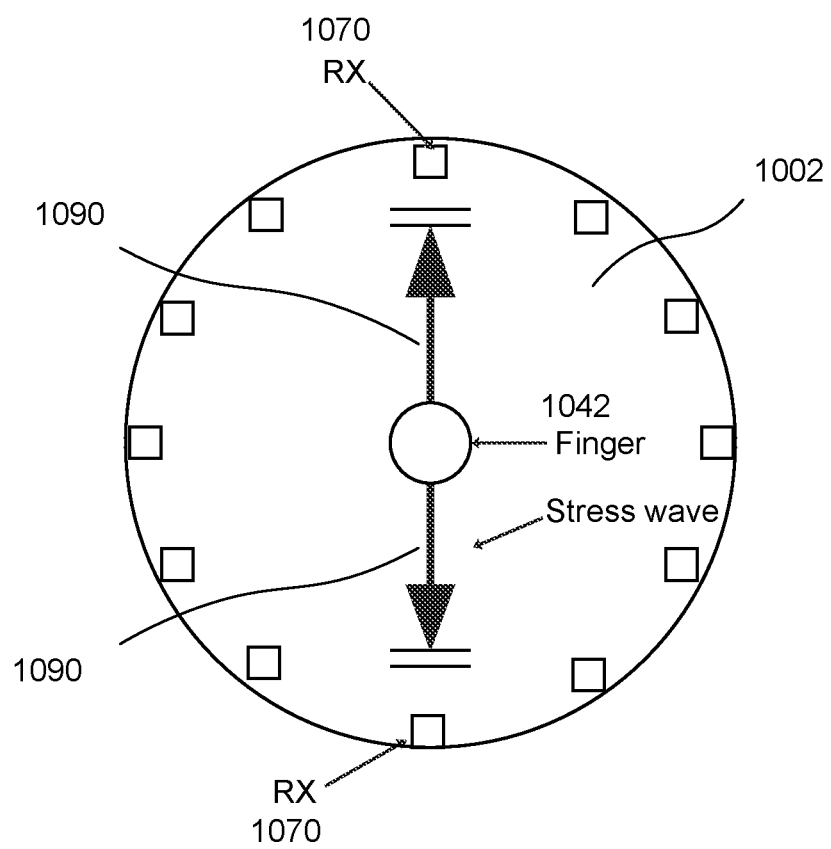
FIG. 10 illustrates first and second passive sensing modalities according to some examples of the disclosure.

FIG. 10 illustrates first and second passive sensing modalities according to some examples of the disclosure. In a first passive sensing modality, the PE transducers are configured as PE receivers 1070, where they listen and attempt to detect the sound at audible frequencies (e.g., 1 kHz) generated by the performance of a gesture such as a tap or a swipe of finger 1042. These gestures produce a friction force on touch surface 1002, which generates waves 1090 that propagate through touch surface 1002 until they are received by PE receivers 1070. Depending on the location of finger 1042 with respect to PE receivers 1070, waves 1090 will be received at the PE receivers at different times (similar to TOF principles). The time differences and/or phase differences of these received waves at the PE receivers can be computed to estimate a location of the touching object. A high sampling rate may be utilized to detect frequencies in the kHz range and improve the location determination accuracy of this first passive sensing modality. For example, to detect frequencies at 1 kHz, sampling at a five times higher rate would be needed to satisfy Nyquist criteria. However, sampling at higher scan rates can require higher power.

In addition, the texture of touch surface 1002 can be configured to enhance the accuracy of the first passive sensing modality. For example, a roughened touch surface 1002 can produce waves 1090 with larger amplitudes, which can improve the SNR. Touch surface 1002 can also be textured to enhance specific types of gestures. For example, the waves generated by a sliding finger pad may be enhanced by a particular surface texture, while the waves generated by a sliding fingernail may be enhanced by a different surface texture. In another example, touch surface 1002 may be textured in certain areas where specific types of gestures are expected. For example, a linear region of touch surface 1002 may be textured to improve the detection of single-dimension sliding or scrolling gestures, while a circular region of the touch surface may be textured to improve the detection of swirling gestures.

In a second passive sensing modality, the PE transducers are also configured as PE receivers 1070, where they listen and attempt to detect the low frequency sounds (e.g., 10-15 Hz) generated by the performance of a gesture such as a tap or a swipe of finger 1042. In this modality, PE receivers 1070 can act as mechanical stress or strain sensors. A low pass filter can be utilized to filter out higher frequency components of the generated waves. These gestures can produce a stress on touch surface 1002, which generates low frequency waves 1090 that propagate through touch surface 1002 until they are received by PE receivers 1070. Depending on the location of finger 1042 with respect to PE receivers 1070, waves 1090 will be received at the PE receivers at different times (similar to TOF principles). The time differences and/or phase differences of these received waves at the PE receivers can be computed to estimate a location of the touching object. This second passive sensing modality can be advantageous in that it is a low power, low sampling rate method for touch detection.

As noted above, in some examples of the disclosure the touch surface can include an array of capacitive touch sensors that can provide a coarse indication of an approaching object, and possibly an inconclusive indication of touch. In other examples, the piezoelectric touch sensing provided by the PE transducers can confirm (or refute) the indication of touch detected by the touch sensors, and/or provide a secondary touch location that can be compared to the touch location determined by the touch sensors. A comparison between the touch locations identified by the touch sensors and the PE transducers can be made, and if the comparison is within a predetermined threshold, the touch location determined by either the touch sensors or the PE transducers can be confirmed.

Figure 11A:
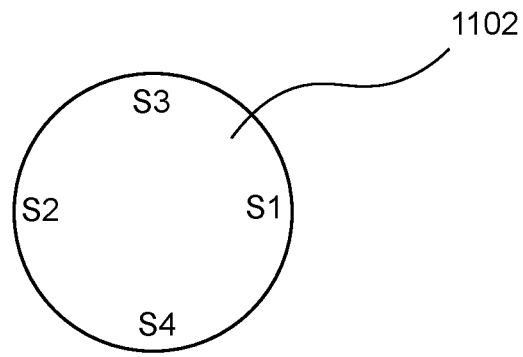
FIGS. 11A-11C illustrate a training algorithm for passive sensing touch location according to some examples of the disclosure.
Figure 11B:
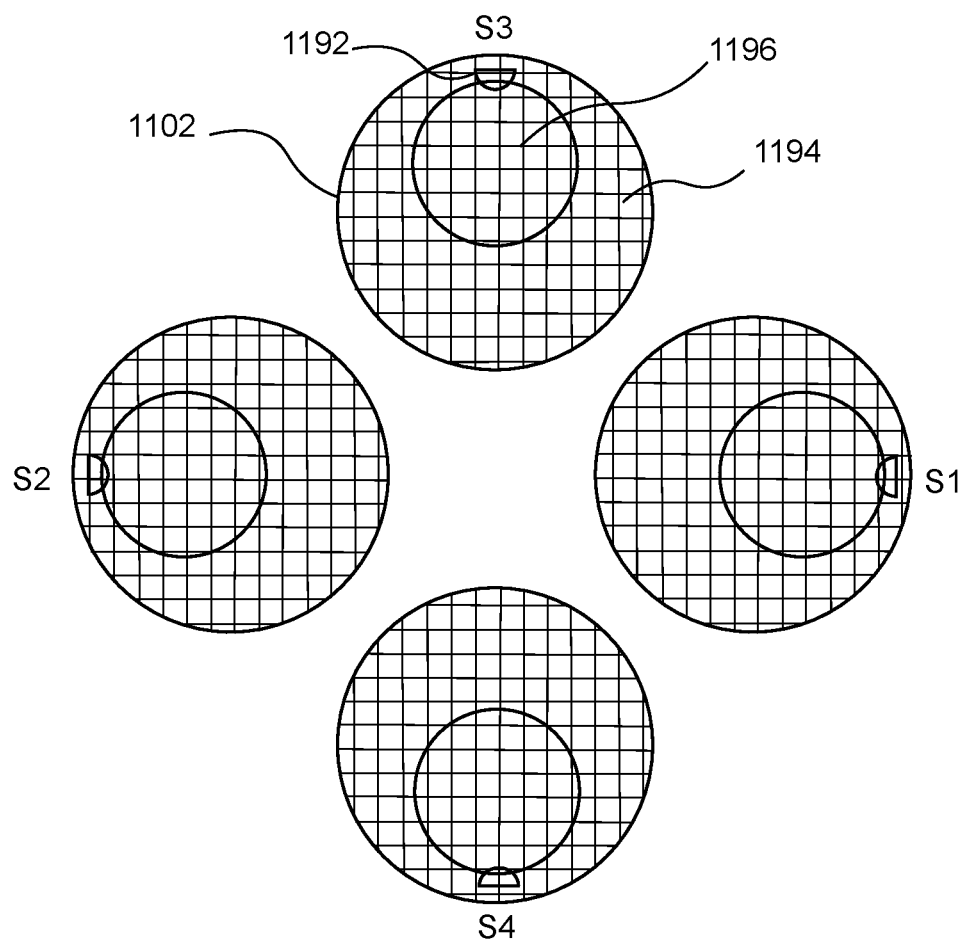
Figure 11C:
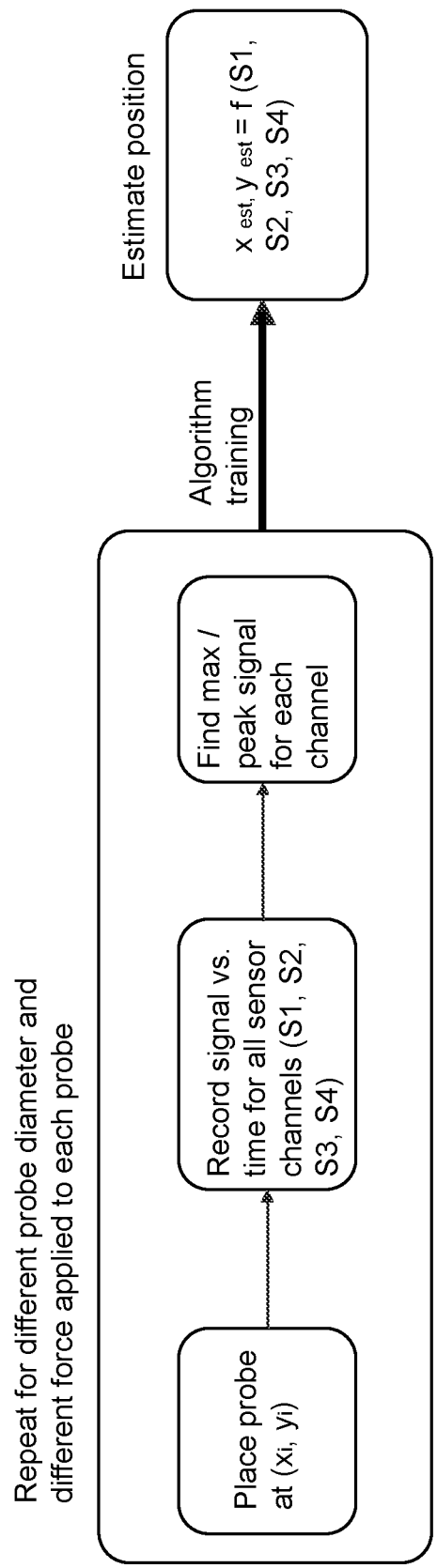

FIGS. 11A-11C illustrate a training algorithm for passive sensing touch location according to some examples of the disclosure. FIG. 11A illustrates touch surface 1102 with four PE transducers configured as PE receivers S1-S4. FIG. 11B illustrates a pictorial view of the normalized peak sensor response of each of the four PE receivers S1-S4. Although only touch surface 1102 for PE receiver S3 is labeled in FIG. 11B, it should be understood that the four touch surface representations in FIG. 11B are actually the same touch surface. Using PE receiver S3 as an example, the grids shown in touch surface 1102 represent locations on the touch surface where a probe has applied a force during a characterization exercise. Region 1192 represents an area where the highest amplitude signals at the frequency of interest (depending on whether the first or second passive sensing modality is being employed) occurred, normalized to a value of "1." Region 1194 represents an area where lower (normalized) amplitude signals at the frequency of interest occurred, and region 1196 represents an area where the lowest (normalized) amplitude signals at the frequency of interest occurred. It should be appreciated that the boundaries of regions 1192, 1194 and 1196 are not actually discrete boundaries, but that received signal amplitudes actually transition gradually between regions.

The characterizations (normalized signal profile) of each grid for each PE receiver S1-S4 as shown in FIG. 11B can then be applied to a neural network or machine learning (ML) algorithm to produce a map of PE receiver responses over all of the locations in touch surface 1102. This map can then be used to convert subsequently obtained PE receiver signals (during actual touch sensing) to an estimated touch location on the touch surface. FIG. 11C illustrates an example algorithm for performing the touch location training of FIG. 11B.

Although various examples have been illustrated and described above primarily in separate figures and paragraphs for clarity, it should be understood that various combinations of the described examples can be utilized together according to further examples of the disclosure.

Therefore, according to the above, some examples of the disclosure are directed to a touch sensing device comprising a touch surface, a housing supporting the touch surface along at least a portion of a perimeter of the touch surface, and one or more piezoelectric transducers coupled to the housing and arranged around at least the portion of the perimeter of the touch surface, wherein the one or more piezoelectric transducers are configured for receiving waves propagating through the touch surface and the housing to detect a touch on the touch surface. Additionally or alternatively to one or more of the examples disclosed above, in some examples the touch sensing device further comprises a first piezoelectric transducer of the one or more piezoelectric transducers configured for both transmitting a first plurality of ultrasonic waves through the touch surface and also receiving one or more reflections of the first plurality of ultrasonic waves through the touch surface. Additionally or alternatively to one or more of the examples disclosed above, in some examples the touch sensing device further comprises one or more first piezoelectric transducers of the one or more piezoelectric transducers configured for transmitting a first plurality of ultrasonic waves at one or more frequencies through the touch surface, and one or more second piezoelectric transducers of the one or more piezoelectric transducers configured for receiving at least one of the first plurality of ultrasonic waves that have propagated through the touch surface. Additionally or alternatively to one or more of the examples disclosed above, in some examples the touch sensing device further comprises one or more partial reflectors formed with the touch surface, the one or more partial reflectors configured for both reflecting a first portion of an ultrasonic wave and passing a second portion of the ultrasonic wave. Additionally or alternatively to one or more of the examples disclosed above, in some examples the one or more partial reflectors are formed with the touch surface at one or more locations that divide the touch surface into a plurality of touch regions. Additionally or alternatively to one or more of the examples disclosed above, in some examples the one or more partial reflectors are formed as one or more notches in the touch surface. Additionally or alternatively to one or more of the examples disclosed above, in some examples the one or more piezoelectric transducers are configured for receiving the waves propagating through the touch surface and the housing at audible frequencies to detect the touch on the touch surface. Additionally or alternatively to one or more of the examples disclosed above, in some examples the one or more piezoelectric transducers are configured for receiving the waves propagating through the touch surface and the housing at low frequencies below 15 Hz to detect a touch on the touch surface. Additionally or alternatively to one or more of the examples disclosed above, in some examples the touch surface is textured in accordance with an expected gesture type. Additionally or alternatively to one or more of the examples disclosed above, in some examples the touch sensing device further comprises a flex circuit, wherein the one or more piezoelectric transducers are formed with the flex circuit, and wherein the flex circuit is configured for being affixed to the housing. Additionally or alternatively to one or more of the examples disclosed above, in some examples the flex circuit is a flat strip that is bent into at least a partially circumferential shape and bonded to the housing. Additionally or alternatively to one or more of the examples disclosed above, in some examples the flex circuit is formed from polyvinylidene fluoride (PVDF), and the one or more piezoelectric transducers are formed from the PVDF in the flex circuit. Additionally or alternatively to one or more of the examples disclosed above, in some examples the touch surface comprises an array of capacitive touch sensors configured for detecting the touch on the touch surface, wherein the touch sensing device further comprises a processor programmed to utilize one or more first touch signals received from the one or more piezoelectric transducers and one or more second touch signals received from the array of capacitive touch sensors to confirm an existence of the touch and a location of the detected touch.

Some examples of the disclosure are directed to a method for detecting a touch on a touch surface having one or more piezoelectric transducers located around a perimeter of the touch surface, comprising launching one or more ultrasonic waves at one or more frequencies from one or more of the piezoelectric transducers into the touch surface, detecting one or more modified first ultrasonic waves resulting from the one or more first ultrasonic waves at one or more of the piezoelectric transducers, and comparing the one or more modified first ultrasonic waves to one or more predetermined parameters to determine whether the touch is present on the touch surface. Additionally or alternatively to one or more of the examples disclosed above, in some examples the one or more modified first ultrasonic waves represent one or more reflected first ultrasonic waves resulting from the one or more first ultrasonic waves, and the method further comprises comparing a time of flight (TOF) of the one or more reflected first ultrasonic waves to one or more predetermined no-touch TOF measurements to determine whether the touch is present on the touch surface. Additionally or alternatively to one or more of the examples disclosed above, in some examples the one or more modified first ultrasonic waves represent one or more attenuated first ultrasonic waves resulting from the one or more first ultrasonic waves, the method further comprising, and the method further comprises comparing an energy of the one or more attenuated first ultrasonic waves to one or more predetermined no-touch energy measurements to determine whether the touch is present on the touch surface. Additionally or alternatively to one or more of the examples disclosed above, in some examples the method further comprises determining a first location of an apparent touch on the touch surface using a touch sensing array co-located with the touch surface, and in accordance with a determination that the touch is present on the touch surface from the comparison of the one or more modified first ultrasonic waves and the one or more predetermined parameters, confirming a presence of the touch on the touch surface. Additionally or alternatively to one or more of the examples disclosed above, in some examples the method further comprises in accordance with the determination that the touch is present on the touch surface from the comparison of the one or more modified first ultrasonic waves and the one or more predetermined parameters, determining a second location of the touch on the touch surface from the comparison, comparing the second location to the first location, and in accordance with a determination that the second location and the first location are within a threshold, confirming the first location as the location of the touch. Additionally or alternatively to one or more of the examples disclosed above, in some examples the one or more modified first ultrasonic waves represent one or more reflected first ultrasonic waves resulting from the one or more first ultrasonic waves, and the method further comprises detecting one or more reflected second ultrasonic waves resulting from the one or more first ultrasonic waves at one or more of the piezoelectric transducers, comparing a first energy of the one or more reflected first ultrasonic waves to one or more predetermined no-touch first energy measurements in a first comparison, comparing a second energy of the one or more reflected second ultrasonic waves to one or more predetermined no-touch second energy measurements in a second comparison, and based on the first and second comparisons, determining whether the touch is present in a first region or a second region on the touch surface.

Some examples of the disclosure are directed to a method for detecting a touch on a touch surface having a plurality of piezoelectric receivers located around a perimeter of the touch surface, comprising detecting a plurality of ultrasonic waves received at the plurality of piezoelectric receivers at a plurality of different receive times, and comparing the different receive times of the plurality of ultrasonic waves detected at the plurality of piezoelectric receivers to estimate a location of the touch on the touch surface.

Although examples of this disclosure have been fully described with reference to the accompanying drawings, it is to be noted that various changes and modifications will become apparent to those skilled in the art. Such changes and modifications are to be understood as being included within the scope of examples of this disclosure as defined by the appended claims.

What is claimed is:

1. A touch sensing device, comprising:
   a touch surface;
   a housing supporting the touch surface along at least a portion of a perimeter of the touch surface; and
   one or more piezoelectric transducers, wherein the housing is coupled between the one or more piezoelectric transducers and the touch surface, and arranged around at least the port ion of the perimeter of the touch surface;
   wherein the one or more piezoelectric transducers are configured for receiving acoustic waves propagating through the touch surface and the housing to detect a touch on the touch surface.

2. The touch sensing device of claim 1, further comprising a first piezoelectric transducer of the one or more piezoelectric transducers configured for both transmitting a first plurality of ultrasonic waves through the touch surface and also receiving one or more reflections of the first plurality of ultrasonic waves through the touch surface.

3. The touch sensing device of claim 1, further comprising one or more first piezoelectric transducers of the one or more piezoelectric transducers configured for transmitting a first plurality of ultrasonic waves at one or more frequencies through the touch surface, and one or more second piezoelectric transducers of the one or more piezoelectric transducers configured for receiving at least one of the first plurality of ultrasonic waves that have propagated through the touch surface.

4. The touch sensing device of claim 1, further comprising one or more partial reflectors formed with the touch surface, the one or more partial reflectors configured for both reflecting a first portion of an ultrasonic wave and passing a second portion of the ultrasonic wave.

5. The touch sensing device of claim 4, wherein the one or more partial reflectors are formed with the touch surface at one or more locations that divide the touch surface into a plurality of touch regions.

6. The touch sensing device of claim 4, wherein the one or more partial reflectors are formed as one or more notches in the touch surface.

7. The touch sensing device of claim 1, wherein the one or more piezoelectric transducers are configured for receiving the acoustic waves propagating through the touch surface and the housing at audible frequencies to detect the touch on the touch surface.

8. The touch sensing device of claim 7, wherein the touch surface is textured in accordance with an expected gesture type.

9. The touch sensing device of claim 1, wherein the one or more piezoelectric transducers are configured for receiving the acoustic waves propagating through the touch surface and the housing at low frequencies below 15 Hz to detect a touch on the touch surface.

10. The touch sensing device of claim 1, further comprising a flex circuit:
    wherein the one or more piezoelectric transducers are formed with the flex circuit; and
    wherein the flex circuit is configured for being affixed to the housing.

11. The touch sensing device of claim 10, wherein the flex circuit is a flat strip that is bent into at least a partially circumferential shape and bonded to the housing.

12. The touch sensing device of claim 10, wherein the flex circuit is formed from polyvinylidene fluoride (PVDF), and the one or more piezoelectric transducers are formed from the PVDF in the flex circuit.

13. The touch sensing device of claim 1, the touch surface comprising an array of capacitive touch sensors configured for detecting the touch on the touch surface;
    wherein the touch sensing device further comprises a processor programmed to utilize one or more first touch signals received from the one or more piezoelectric transducers and one or more second touch signals received from the array of capacitive touch sensors to confirm an existence of the touch and a location of the detected touch.

14. A method for detecting a touch on a touch surface supported by a housing and having one or more piezoelectric transducers located around a perimeter of the touch surface, wherein the housing is coupled between the one or more piezoelectric transducers and the touch surface, comprising:
    launching one or more first ultrasonic waves at one or more frequencies from one or more of the piezoelectric transducers into the touch surface;
    detecting one or more modified first ultrasonic waves propagating through the touch surface and the housing resulting from the one or more first ultrasonic waves at one or more of the piezoelectric transducers; and
    comparing the one or more modified first ultrasonic waves to one or more predetermined parameters to determine whether the touch is present on the touch surface.

15. The method of claim 14, wherein the one or more modified first ultrasonic waves represent one or more reflected first ultrasonic waves resulting from the one or more first ultrasonic waves, the method further comprising:
    comparing a time of flight (TOF) of the one or more reflected first ultrasonic waves to one or more predetermined no-touch TOF measurements to determine whether the touch is present on the touch surface.

16. The method of claim 14, wherein the one or more modified first ultrasonic waves represent one or more attenuated first ultrasonic waves resulting from the one or more first ultrasonic waves, the method further comprising:
    comparing an energy of the one or more attenuated first ultrasonic waves to one or more predetermined no-touch energy measurements to determine whether the touch is present on the touch surface.

17. The method of claim 14, further comprising:
    determining a first location of an apparent touch on the touch surface using a touch sensing array co-located with the touch surface; and
    in accordance with a determination that the touch is present on the touch surface from the comparison of the one or more modified first ultrasonic waves and the one or more predetermined parameters, confirming a presence of the touch on the touch surface.

18. The method of claim 17, further comprising:
    in accordance with the determination that the touch is present on the touch surface from the comparison of the one or more modified first ultrasonic waves and the one or more predetermined parameters, determining a second location of the touch on the touch surface from the comparison;
    comparing the second location to the first location; and
    in accordance with a determination that the second location and the first location are within a threshold, confirming the first location as the location of the touch.

19. The method of claim 14, wherein the one or more modified first ultrasonic waves represent one or more reflected first ultrasonic waves resulting from the one or more first ultrasonic waves, the method further comprising:
    detecting one or more reflected second ultrasonic waves resulting from the one or more first ultrasonic waves at one or more of the piezoelectric transducers;
    comparing a first energy of the one or more reflected first ultrasonic waves to one or more predetermined no-touch first energy measurements in a first comparison;
    comparing a second energy of the one or more reflected second ultrasonic waves to one or more predetermined no-touch second energy measurements in a second comparison; and
    based on the first and second comparisons, determining whether the touch is present in a first region or a second region on the touch surface.

20. A method for detecting a touch on a touch surface supported by a housing and having a plurality of piezoelectric receivers located around a perimeter of the touch surface, wherein the housing is coupled between the plurality of piezoelectric receivers and the touch surface, comprising:
    detecting a plurality of ultrasonic waves propagating through the touch surface and the housing received at the plurality of piezoelectric receivers at a plurality of different receive times; and
    comparing the different receive times of the plurality of ultrasonic waves detected at the plurality of piezoelectric receivers to estimate a location of the touch on the touch surface.

* * * * *